United States Patent
Ohba et al.

(10) Patent No.: US 7,573,094 B2
(45) Date of Patent: Aug. 11, 2009

(54) RANDOM NUMBER GENERATING ELEMENT

(75) Inventors: Ryuji Ohba, Kawasaki (JP); Shinobu Fujita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 251 days.

(21) Appl. No.: 10/997,943

(22) Filed: Nov. 29, 2004

(65) Prior Publication Data

US 2005/0180219 A1 Aug. 18, 2005

(30) Foreign Application Priority Data

Dec. 5, 2003 (JP) ............................. 2003-407949

(51) Int. Cl.
*H01L 29/792* (2006.01)

(52) U.S. Cl. ............... 257/324; 257/405; 257/E29.301; 257/E29.309; 365/185.18; 365/185.28

(58) Field of Classification Search ................ 258/405; 327/164; 463/22; 365/185.28, 185.18, 185.24, 365/185.29; 257/324, 405, E29.301, E29.001, 257/30, 48, E21.521, 314

See application file for complete search history.

(56) References Cited

U.S. PATENT DOCUMENTS

| 2003/0162587 A1 * | 8/2003 | Tanamoto et al. ............. 463/22 |
| 2005/0180219 A1 | 8/2005 | Ohba et al. |

FOREIGN PATENT DOCUMENTS

| JP | 03-108364 | 4/2003 |
| JP | 03-173254 | 6/2003 |
| JP | 03-258240 | 9/2003 |

OTHER PUBLICATIONS

U.S. Appl. No. 11/743,265, filed May 2, 2007, Matsumoto, et al.
U.S. Appl. No. 12/130,567, filed May 30, 2008, Matsumoto, et al.

* cited by examiner

*Primary Examiner*—Sue Purvis
*Assistant Examiner*—Fazli Erdem
(74) *Attorney, Agent, or Firm*—Oblon, Spivak, McClelland, Maier & Neustadt, P.C.

(57) ABSTRACT

Random number generating element comprises source region, drain region, semiconductor channel provided between source region and drain region and having portion of width W and length L, width W and length L satisfying $W \leq (\pi/10(\mu m^2))/L$, tunnel insulation film provided on semiconductor channel, and conductive fine particle group containing conductive fine particles provided on tunnel insulation film with surface density not less than $2.5 \times 10^{11}$ cm$^{-2}$, charge and discharge of electrons generating between conductive fine particles and semiconductor channel via tunnel insulation film, wherein following inequalities are satisfied:

$LWD_{dot} \geq [R_{Tunnel}/R_{Tunnel}(Tox=0.8\ nm)]^{0.3\ nm/T} \times \exp[0.3\ nm \times (0.8\ nm/T) \times (4\pi(2m \times 3.1\ eV)^{1/2}/h)]$, $(q/4\pi \in T) \leq 26 meV$, $[D_{dot} \times d^{4/3}/(W \times L^{1/2})] \times [R_{Tunnel}/R_{Tunnel}(Tox=0.8\ nm)]^{-2/3} \geq 8000 \times 21/2 (\mu m^{-13/6})$ where $D_{dot}$ represents surface density, d average diameter, T thickness, $R_{tunnel}$ tunnel resistance per unit area, $R_{tunnel}$ (Tox=0.8 nm) tunnel resistance, per unit area, of tunnel oxide film with thickness of 0.8 nm, h Plank's constant, q elemental charge, m effective mass, and ∈ dielectric constant.

30 Claims, 15 Drawing Sheets

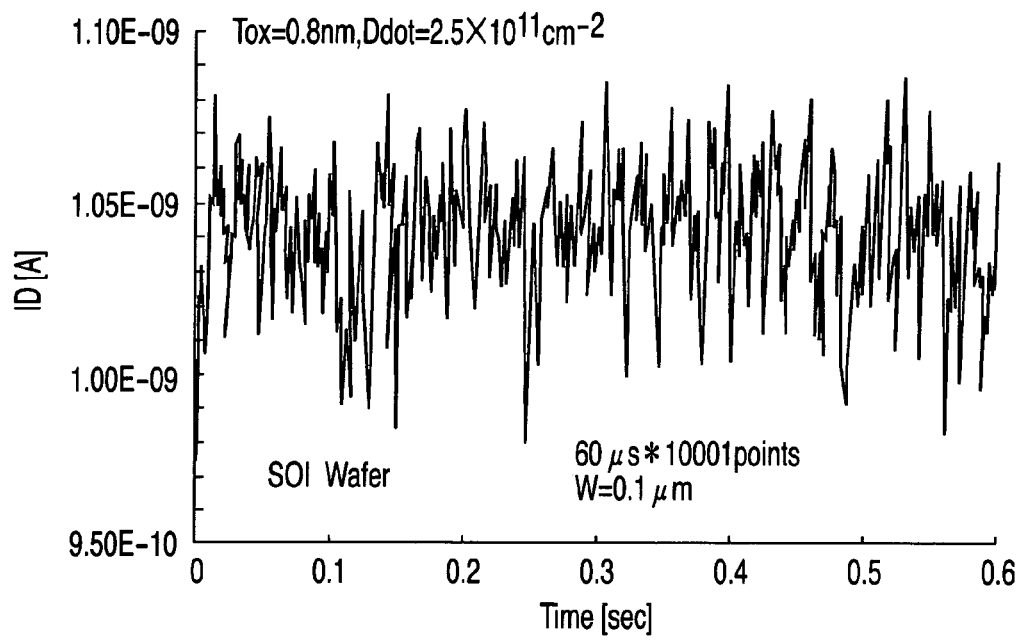
F I G. 4
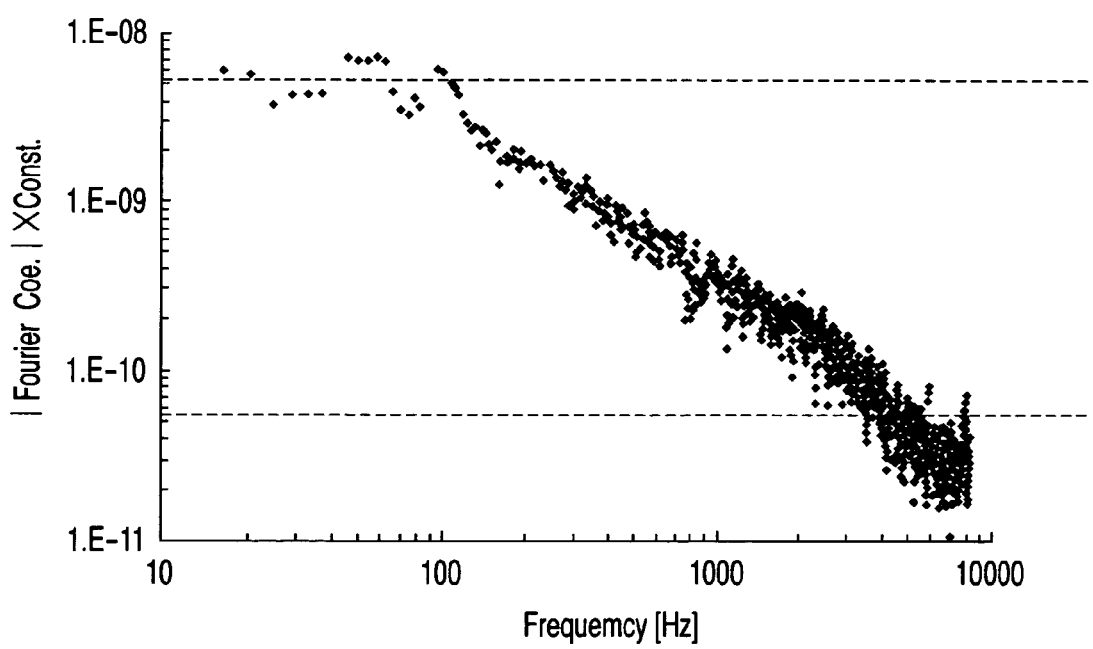
F I G. 5

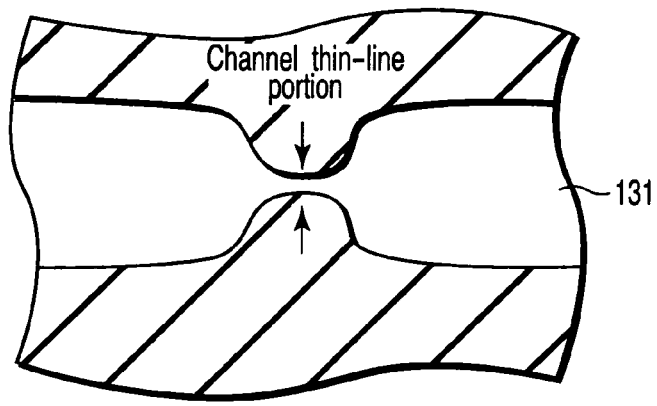
F I G. 15A
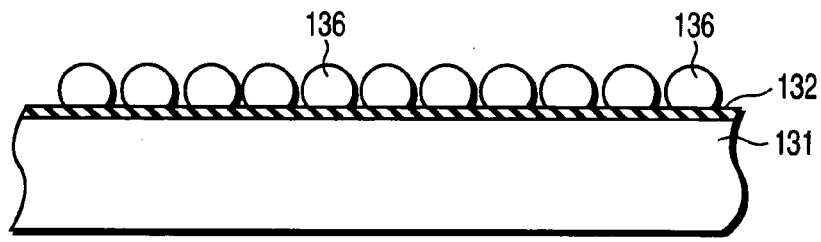
F I G. 15B
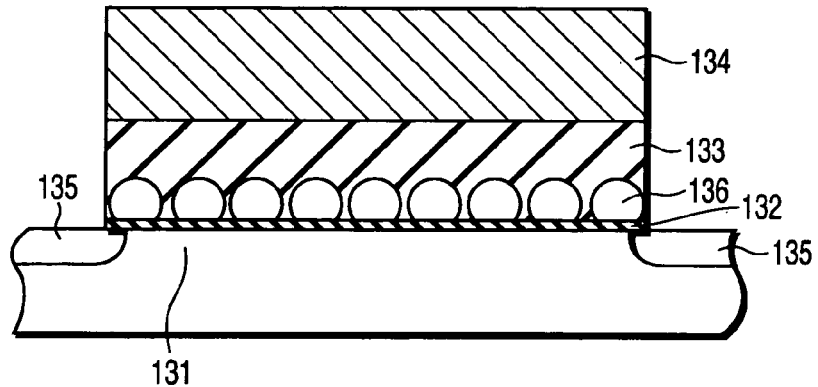
F I G. 15C
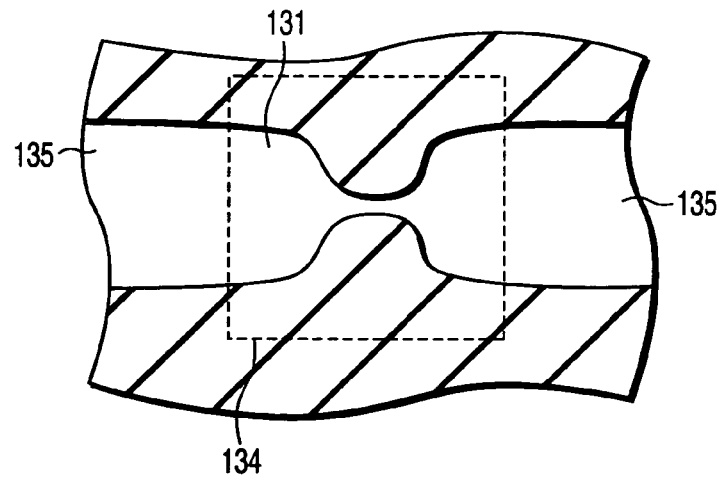
F I G. 15D

RANDOM NUMBER GENERATING ELEMENT

CROSS-REFERENCE TO RELATED APPLICATIONS

This application is, based upon and claims the benefit of priority from prior Japanese Patent Application No. 2003-407949, filed Dec. 5, 2003, the entire contents of which are incorporated herein by reference.

BACKGROUND OF THE INVENTION

1. Field of the Invention

The present invention relates to a random number generating element, and more particularly to a random number generating element that can be used to generate, for example, a cipher for protection of information.

2. Description of the Related Art

Pseudo-random numbers, which can be easily generated, are often used as random numbers needed to generate cipher keys for information security and protection. However, to realize higher security, it is necessary to use genuine random numbers to avoid a cipher being broken. To generate genuine random numbers, the natural phenomenon of random noise can be utilized.

In a certain random number generating element utilizing a physical phenomenon, random noise, such as thermal noise in a current flowing through a Schottky diode, is digitized to generate random numbers. More specifically, a Schottky diode current is filtered to eliminate part of its direct-current component, and then amplified to increase the ratio of the random noise component. The amplified random noise signal is oscillated by an oscillator circuit using a flip-flop. Fluctuations in the cycle of the random noise signal corresponding to those in the current are counted in synchronism with a clock signal of a higher frequency, and digitized, thereby generating a random number sequence. Since a physical phenomenon is utilized, random numbers close to genuine random numbers can be produced, which increases the security level, compared to the case of utilizing pseudo-random numbers.

On the other hand, the inventors of the present invention have developed a random number generating element capable of generating genuine random numbers utilizing electronic tunneling (see Jpn. Pat. Appln. KOKAI Publication No. 2003-108364).

To generate random numbers for information protection, a generation rate of 1 Mbit/s or more is required. However, in a random number generating element using random noise such as thermal noise mixed in a current flowing through a Schottky diode, only about $10^{-5}\%$ of the whole random noise component is a 1-MHz or more random noise component. Accordingly, an amplification of about $10^5$ times is required, which may degrade the genuineness of the produced random numbers, or may significantly enlarge the entire apparatus because of the required amplifier circuit.

BRIEF SUMMARY OF THE INVENTION

According to a first aspect of the invention, there is provided a random number generating element comprising: a source region; a drain region; a semiconductor channel provided between the source region and the drain region and having a thin-line portion of a width W and a length L, the width W and the length L satisfying $W \leq (\pi/10(\mu m^2))/L$; a tunnel insulation film provided on the semiconductor channel; and a conductive fine particle group containing a plurality of conductive fine particles provided on the tunnel insulation film with a surface density not less than $2.5 \times 10^{11}$ cm$^{-2}$, charge and discharge of electrons generating between the conductive fine particles and the semiconductor channel via the tunnel insulation film, wherein the following inequalities are satisfied:

$$LWD_{dot} \geq [R_{Tunnel}/R_{Tunnel}(\text{Tox}=0.8 \text{ nm})]^{0.3 \text{ nm}/T} \times \exp[0.3 \text{ nm} \times (0.8 \text{ nm}/T) \times (4\pi(2 \text{ m} \times 3.1 \text{ eV})^{1/2}/h)],$$

$$(q/4\pi \in T) \leq 26 meV,$$

$$[D_{dot} \times d^{4/3}/(W \times L^{1/2})] \times [R_{Tunnel}/R_{Tunnel}(\text{Tox}=0.8 \text{ nm})]^{-2/3} \geq 8000 \times 2^{1/2}(\mu m^{-13/6})$$

where $D_{dot}$ represents the surface density of the conductive fine particles, d an average diameter of the conductive fine particles, T a thickness of the tunnel insulation film, $R_{tunnel}$ a tunnel resistance of the tunnel insulation film per unit area, $R_{tunnel}$ (Tox=0.8 nm) a tunnel resistance, per unit area, of a tunnel oxide film with a thickness of 0.8 nm, h Plank's constant, q elemental charge, m an effective mass of a tunnel via the tunnel insulation film, and $\in$ a dielectric constant of the tunnel insulation film.

According to a second aspect of the invention, there is provided a random number generating element comprising: a source region; a drain region; a semiconductor channel provided between the source region and the drain region and having a thin-line portion of a width W and a length L, the width W and the length L satisfying $W \leq (\pi/10(\mu m^2))/L$; a tunnel insulation film provided on the semiconductor channel; and a conductive fine particle group containing a plurality of conductive fine particles provided on the tunnel insulation film with a surface density not less than $2.5 \times 10^{11}$ cm$^{-2}$, charge and discharge of electrons generating between the conductive fine particles and the semiconductor channel via the tunnel insulation film, wherein the following inequalities are satisfied:

$$LWD_{dot} \geq \exp(0.3 \text{ nm} \times 4\pi(2mH)^{1/2}/h),$$

$$(q/4\pi \in T) \leq 26 \text{ } meV,$$

$$(D_{dot} \times d^{4/3}/W) \times \exp(-8\pi T(2 \text{ } mH)^{1/2}/3 \text{ } h) \times (0.5 \text{ } \mu m/L)^{1/2} \geq 40(\mu m^{-5/3})$$

where $D_{dot}$ represents the surface density of the conductive fine particles, d an average diameter of the conductive fine particles, T a thickness of the tunnel insulation film, H an energy barrier height of the tunnel insulation film, h Plank's constant, q elemental charge, m an effective mass of a tunnel via the tunnel insulation film, and $\in$ a dielectric constant of the tunnel insulation film.

According to a third aspect of the invention, there is provided a random number generating element comprising: a source region; a drain region; a semiconductor channel provided between the source region and the drain region and having a thin-line portion of a width W and a length L, the width W and the length L satisfying $W \leq (\pi/10(\mu m^2))/L$; a tunnel insulation film provided on the semiconductor channel; and a conductive fine particle group containing a plurality of conductive fine particles provided on the tunnel insulation film with a surface density not less than $2.5 \times 10^{11}$ cm$^{-2}$, charge and discharge of electrons generating between the conductive fine particles and the semiconductor channel via the tunnel insulation film, wherein the following inequalities are satisfied:

$$LWD_{dot} \geq [R_{Tunnel}/R_{Tunnel}(\text{Tox}=0.8\text{ nm})]^{0.3\text{ nm}/T} \times \exp[0.3\text{ nm} \times (0.8\text{ nm}/T) \times (4\pi(2m \times 3.1\text{ eV})^{1/2}/h)],$$

$$(q/4\pi\in T) \leq 26 meV,$$

$$[D_{dot} \times d^{4/3}/(W \times L^{1/2})] \times [R_{Tunnel}/R_{Tennel}(\text{Tox}=0.8\text{ nm})]^{-2/3} \geq 800 \times 2^{1/2}(\mu m^{-13/6})$$

where $D_{dot}$ represents the surface density of the conductive fine particles, d an average diameter of the conductive fine particles, T a thickness of the tunnel insulation film, $R_{tunnel}$ a tunnel resistance of the tunnel insulation film per unit area, $R_{tunnel}$ (Tox=0.8 nm) a tunnel resistance, per unit area, of a tunnel oxide film with a thickness of 0.8 nm, h Plank's constant, q elemental charge, m an effective mass of a tunnel via the tunnel insulation film, and $\in$ a dielectric constant of the tunnel insulation film.

According to a fourth aspect of the invention, there is provided a random number generating element comprising: a source region; a drain region; a semiconductor channel provided between the source region and the drain region and having a thin-line portion of a width W and a length L, the width W and the length L satisfying $W \leq (\pi/10(\mu m^2))/L$; a tunnel insulation film provided on the semiconductor channel; and a conductive fine particle group containing a plurality of conductive fine particles provided on the tunnel insulation film with a surface density not less than $2.5 \times 10^{11}$ $cm^{-2}$, charge and discharge of electrons generating between the conductive fine particles and the semiconductor channel via the tunnel insulation film, wherein the following inequalities are satisfied:

$$LWD_{dot} \geq \exp(0.3\text{ nm} \times 4\pi(2\ mH)^{1/2}/h),$$

$$(q/4\pi\in T) \leq 26\ meV,$$

$$(D_{dot} \times d^{4/3}/W) \times \exp(-8\pi T(2\ mH)^{1/2}/3\ h) \times (0.5\ \mu m/L)^{1/2} \geq 4(\mu m^{-5/3})$$

where $D_{dot}$ represents the surface density of the conductive fine particles, d an average diameter of the conductive fine particles, T a thickness of the tunnel insulation film, H an energy barrier height of the tunnel insulation film, h Plank's constant, q elemental charge, m an effective mass of a tunnel via the tunnel insulation film, and $\in$ a dielectric constant of the tunnel insulation film.

BRIEF DESCRIPTION OF THE SEVERAL VIEWS OF THE DRAWING

FIG. 4 is a graph illustrating experimental results concerning fluctuations in a current flowing through a random number generating element actually prepared by the inventor, the fluctuations occurring when a fixed bias is applied to the element, the random number generating element including: a channel having a thin-line portion with a width W of 0.1 μm and a length L of 0.5 μm and formed in an SOI substrate; Si fine crystal particles having an average diameter of 8 nm and formed with a surface density of about $2.5 \times 10^{11}$ $cm^{-2}$; and a tunnel oxide film with a thickness of 0.8 nm.

FIG. 5 is a graph illustrating Fourier characteristic values corresponding to the fluctuations in current shown in FIG. 4;

FIGS. 15A to 15D are views illustrating processes for producing a random number generating element according to a seventh embodiment;

DETAILED DESCRIPTION OF THE INVENTION

Firstly, the general concept of the embodiment will be described.

Figure 1:
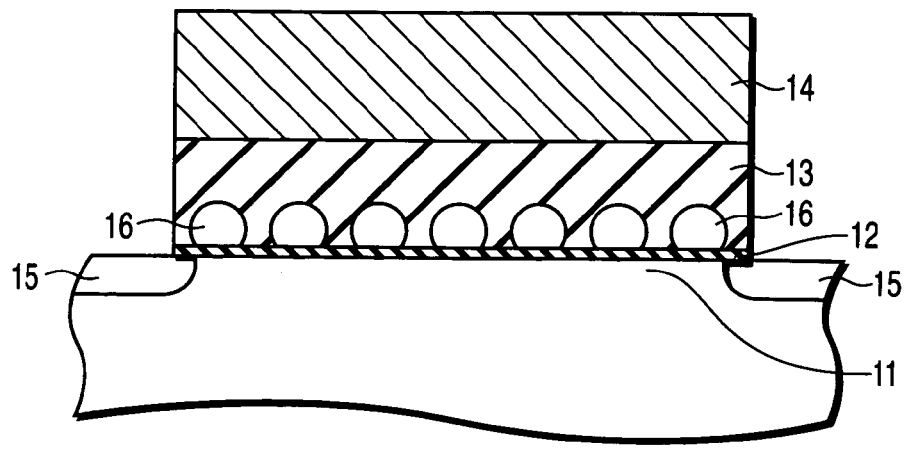
FIG. 1 is a sectional view illustrating a random number generating element according to the embodiment of the invention.

FIG. 1 is a sectional view illustrating a random number generating element according to the embodiment.

Figure 2:
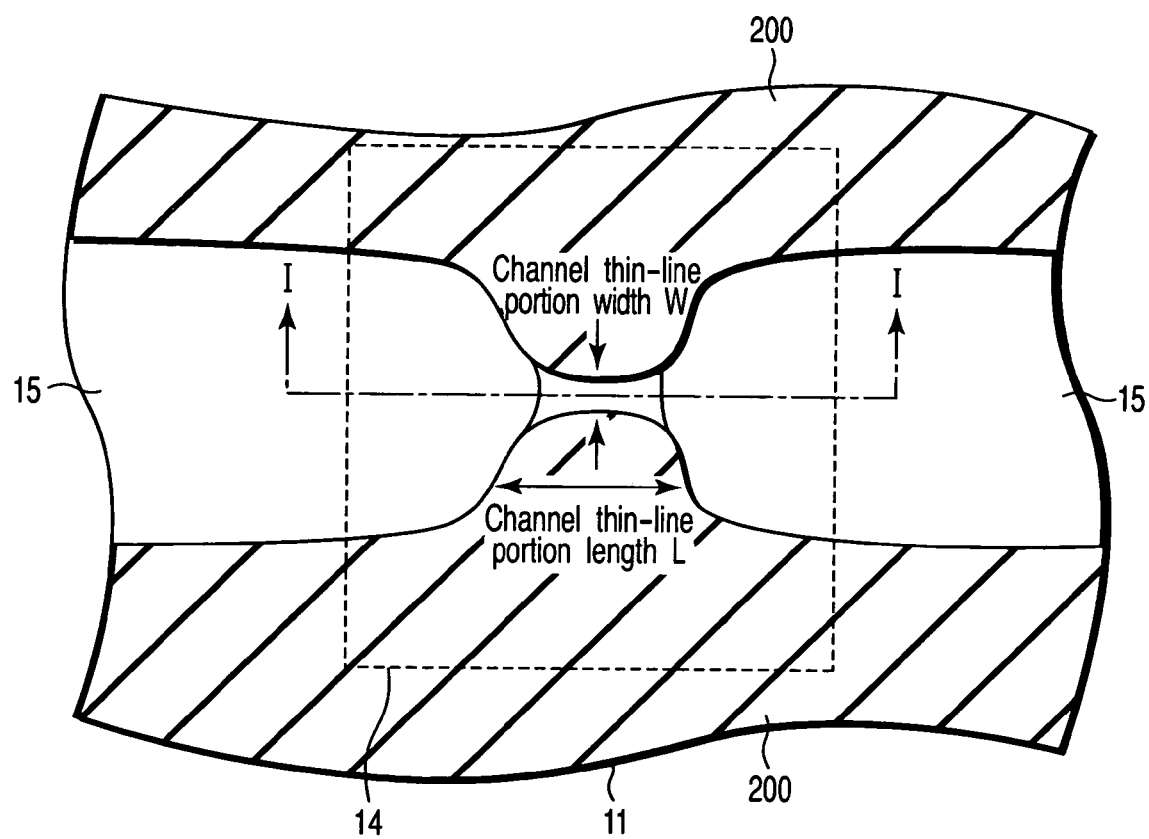
FIG. 2 is a plan view illustrating the channel region of the random number generating element of the embodiment of the invention.

FIG. 2 is a plan view illustrating the channel region of the random number generating element of the embodiment.

As shown, the random number generating element of the embodiment comprises source/drain diffusion layers 15 formed in the surface of a silicon substrate, and a channel 11 formed therebetween. As can be seen from FIG. 2, the channel 11 has a thin-line portion of width W and length L. The channel 11 and source/drain diffusion layers 15 are appropriately isolated by an element-isolating layer 200.

A tunnel isolation film 12 is provided on the channel 11, and a plurality of conductive particles 16, e.g., silicon (Si) fine crystal particles, are provided on the film 12. Further, a control oxide film 13 and $n^+$ polysilicon gate electrode 14 are stacked on the crystal particles 16.

In other words, the random number generating element of the embodiment has a metal oxide semiconductor field effect transistor (MOSFET) structure, wherein a large number of conductive particles 16 are provided, which can charge and discharge electrons between them and the semiconductor channel 11 via the very thin tunnel insulation film 12.

In the random number generating element of this structure, if the width W of the channel 11 is narrowed, the surface density $D_{dot}$ of the conductive particles 16 is increased, and the tunnel resistance $R_t$ between the channel 11 and particles 16 is reduced, 0.1% or more of a 1-MHz random noise component can be acquired.

Specifically, since only the very thin tunnel insulation film 12 is interposed between the channel 11 and conductive particles 16, random charge/discharge of electrons occurs due to thermal fluctuations. As a result, random noise occurs in the drain current flowing through the channel 11. If the width W of the channel 11 is narrowed, the influence of the elementary charge in the conductive particles 16 upon the current is increased, thereby increasing the level of random noise.

Further, if the surface density $D_{dot}$ of the conductive particles 16 is increased, the intensity of random oscillation is increased to thereby increase the level of random noise.

In addition, if the tunnel resistance $R_t$ between the channel 11 and particles 16 is reduced to further quicken the charge/discharge of electrons, random noise can be acquired more quickly.

The ranges of the width W, surface density $D_{dot}$ and tunnel resistance $R_t$ can be determined from, for example, experimental data. If 0.1% or more of 1-MHz or more random noise is generated, when a flip-flop circuit generates an oscillation of 1 MHz, a fluctuation component is 0.1% or more in a period of 1 μs (i.e., the period of the fluctuation component is 1 ns or more). If the fluctuations are counted by, for example, a ring oscillator in synchronism with a high-speed clock of e.g., 1 GHz, and then digitized, random numbers of 1 Mbit/s or more can be generated. Thus, genuine random numbers can be reproduced by a very compact circuit structure that uses no amplifiers but simply utilizes a physical phenomenon.

Figure 16:
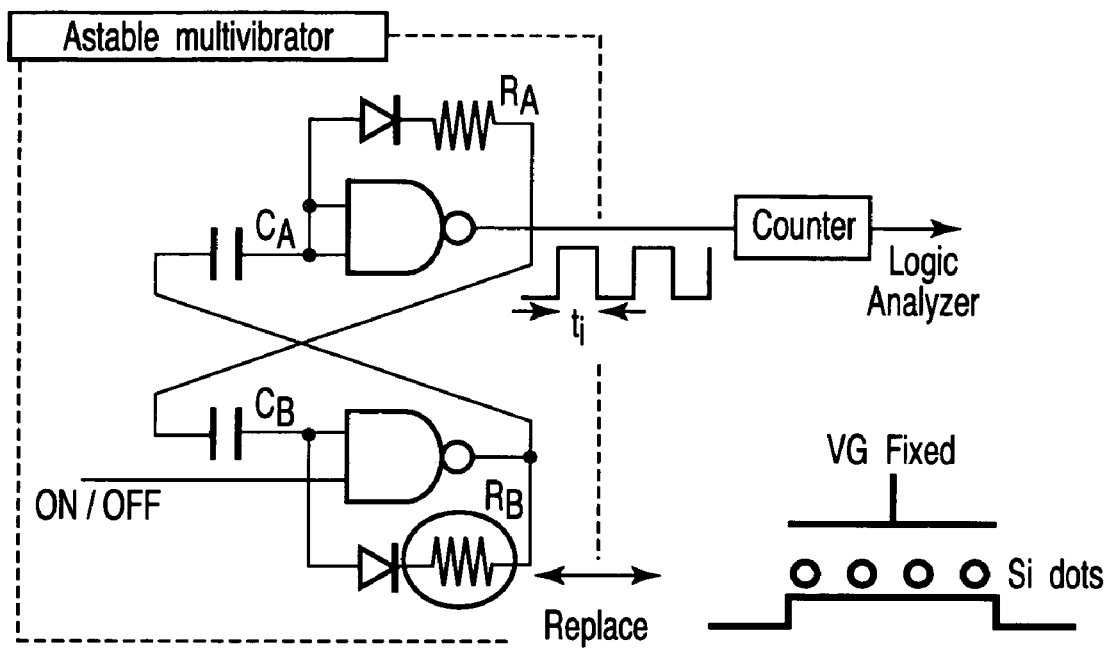
FIG. 16 is a view illustrating an example of an oscillation circuit using a flip-flop.

An example of an oscillation circuit is shown in FIG. 16.

Specifically, FIG. 16 shows an astable multi-vibrator. In this vibrator, if resistance $R_B$ is replaced with an Si-dot metal oxide semiconductor field-effect transistor (MOSFET) random number generating element having its gate voltage fixed according to the present embodiment, pulses are oscillated in an oscillation cycle $t_f (=R_B C_B)$ that is proportional to resistor $R_B$, i.e., the drain-voltage/drain-current. Accordingly, where the drain voltage is fixed, and the percentage of a fluctuation component at 1 MHz in the drain current is 0.1%, if pulses are oscillated in an oscillation cycle $t_f$ of about 1 μs, they vary with fluctuation of about 1 ns that is 0.1% of each pulse cycle. Therefore, if a high-rate clock of about 1 GHz, such as a ring oscillator, is used as a counter, each cycle is discriminated as "0" and "1". For example, if an even (or odd) number of high-rate clock pulses are contained in one cycle $t_f$, 0 (or 1) may be assigned thereto in units of cycles $t_f$. Even an oscillation circuit other than that shown in FIG. 16 performs oscillation proportional to the drain-voltage/drain-current. Accordingly, if the percentage of the fluctuation component in the drain current at 1 MHz is 0.1%, random numbers can be generated at a rate of about 1 Mbit/s.

Embodiments of the invention will now be described in detail with reference to the accompanying drawings

FIRST EMBODIMENT

Firstly, a description will be given of a random number generating element according to a first embodiment, in which a tunnel insulation film made of a nitride is provided on a silicon-on-insulator (SOI) substrate.

FIGS. 3A to 3D show manufacturing processes of the random number generating element of the first embodiment.

Figure 3A:
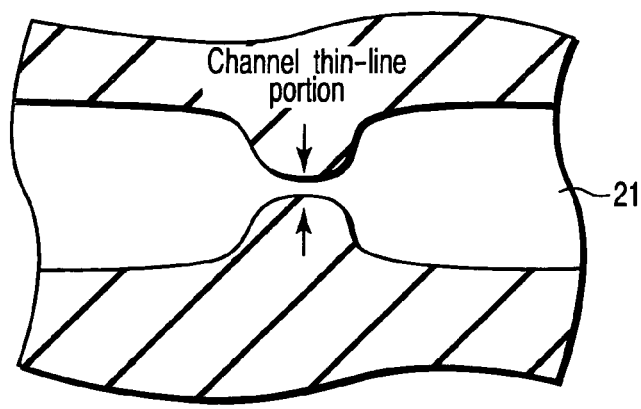
FIGS. 3A to 3D are views illustrating processes for producing a random number generating element according to a first embodiment.

Firstly, as shown in the plan view of FIG. 3A, a channel thin-line portion pattern having a width W of 0.01 μm and a length of 0.5 μm is formed in the surface of the SOI substrate 21 by lithography using an electron or X-ray beam.

Figure 3B:
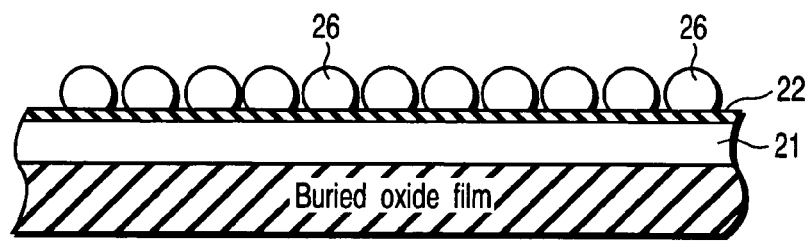

Subsequently, as shown in the sectional view of FIG. 3B, the tunnel insulation film 22 and conductive particles 26 are formed. More specifically, a thermal nitride film 22 with a thickness T of 0.8 nm is formed by thermally nitrifying the surface of the substrate using $NH_3$. Further, Si fine crystal particles 26 having an average particle diameter of 8 nm are formed on the film 22 with a surface density of about $1.7 \times 10^{12}$ $cm^{-2}$ by low-pressure chemical vapor deposition (LPCVD). The diameter of the particles 26 can be adjusted by the time taken for CVD, and the surface density can be adjusted by the flow of material gas and the number of applications of CVD.

Figure 3C:
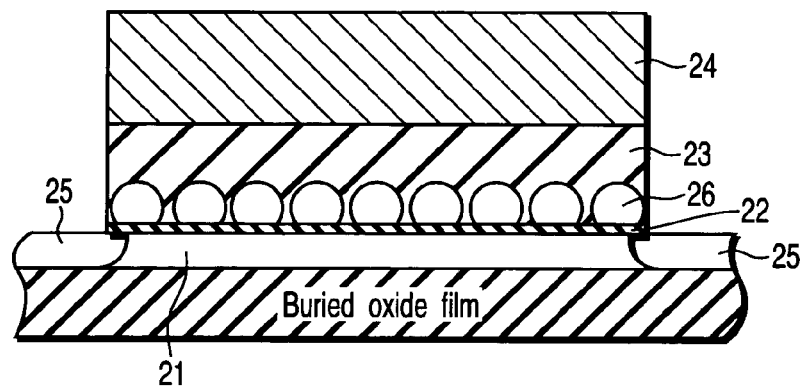
Figure 3D:
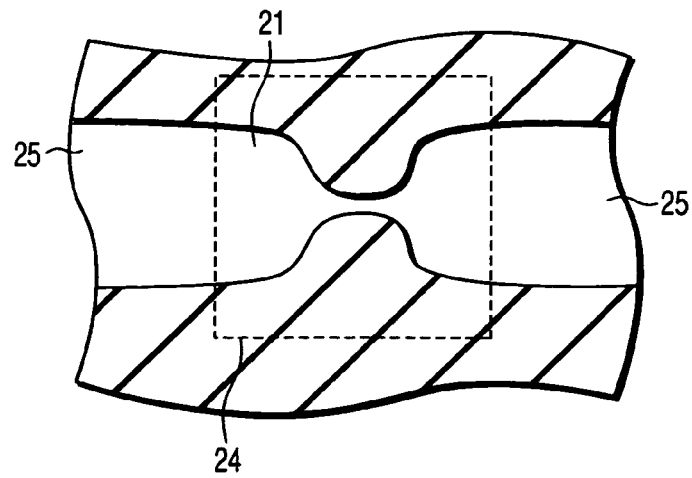

After that, as shown in the sectional view of FIG. 3C and plan view of FIG. 3D, a control oxide film 23 with a thickness of 10 nm is formed by LPCVD, and an $n^+$ polysilicon layer 24 with a thickness of 200 nm, which will serve as a gate electrode, is deposited on the film 23 by CVD.

Thereafter, the gate electrode 24 is formed by patterning, and phosphorus (P) is implanted in a concentration of $1 \times 10^{15}$ $cm^{-2}$ with an implantation energy of 15 KeV. The resultant structure is annealed at 1000° C. for 20 sec., thereby forming $n^+$ layers 25 serving as source/drain regions.

The random number generating element produced by the above-described process can generate random noise containing 0.1% or more of a 1-MHz oscillation component. The reason why the random number generating element of the first embodiment contains 0.1% or more of a 1-MHz oscillation component will now be described.

FIG. 4 is a graph illustrating experimental results concerning fluctuations in the current flowing through the random number generating element prepared by the inventor for experiments, the fluctuations occurring when a fixed bias is applied to the element. This random number generating element includes: a channel having a thin-line portion with a width W of 0.1 μm and a length L of 0.5 μm and formed in the surface of an SOI substrate; Si fine crystal particles having an average diameter of 8 nm and formed with a surface density of about $2.5 \times 10^{11}$ $cm^{-2}$; and a tunnel oxide film with a thickness of 0.8 nm.

Further, FIG. 5 is a graph illustrating Fourier characteristic values (more specifically, each Fourier characteristic value corresponds to the absolute value of a Fourier coefficient) corresponding to the fluctuations in current shown in FIG. 4.

It can be understood from FIG. 4 that the current fluctuation component of the reference random number generating element related to the first embodiment is 10% of the entire current. Further, it can be understood from FIG. 5 that 1/100 of the current fluctuation component, i.e., 0.1% of the entire current, occurs around 5 kHz.

Further, the inventor has prepared similar random number generating elements on SOI substrates similar to the above but having their structural parameter varied, and has inspected their characteristics.

Figure 6:
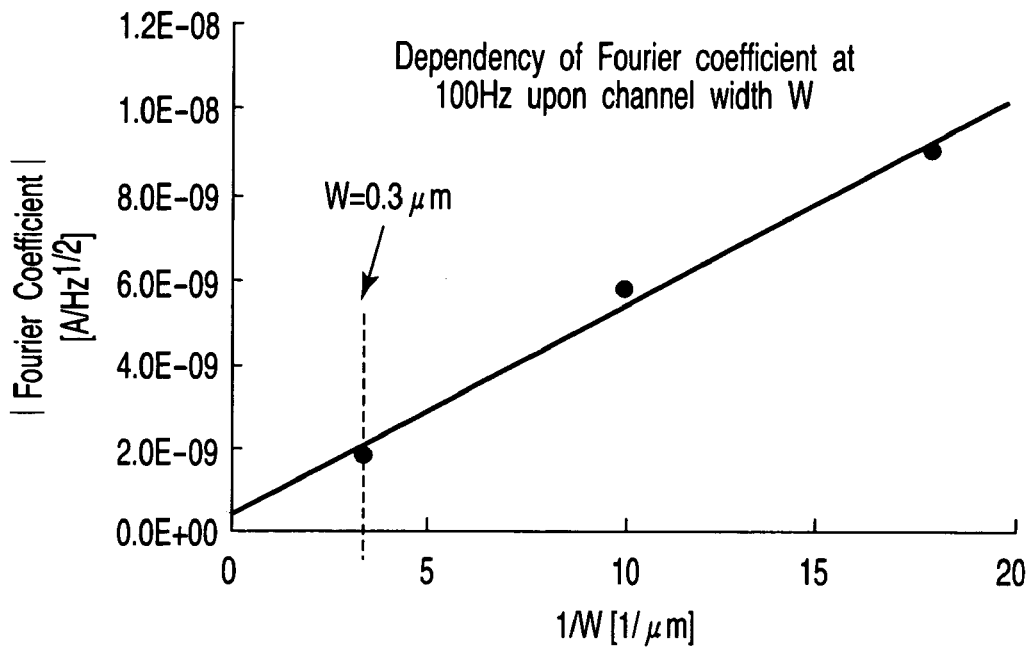
FIG. 6 is a graph illustrating the relationship between the Fourier coefficient at 100 Hz and the width W of a channel thin-line portion, acquired from random number generating elements.

FIG. 6 shows the relationship between the Fourier coefficient at 100 Hz and the width W of the channel thin-line portion, acquired from the random number generating elements. It can be understood from FIG. 6 that the random noise Fourier characteristic is proportional to 1/W provided $W \leq 0.3$ μm.

Figure 7:
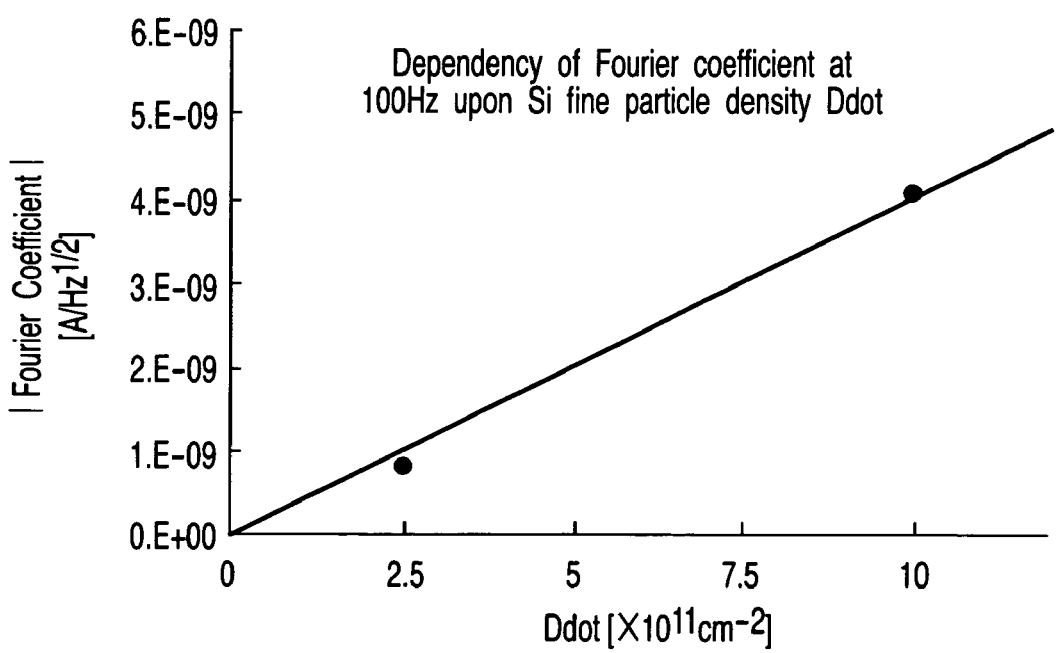
FIG. 7 is a graph illustrating the relationship between the Fourier coefficient at 100 Hz and the surface density $D_{dot}$ of Si fine particles, acquired from random number generating elements.

Furthermore, FIG. 7 shows the relationship between the Fourier coefficient at 100 Hz and the surface densities D of Si fine particles, acquired from the elements. It can be understood from FIG. 7 that the random noise Fourier characteristic is proportional to $D_{dot}$ provided $D_{dot} \geq 2.5 \times 10^{11}$ cm$^{-2}$. In the case of superposition of independent random variables, it can be statistically considered that fluctuation is proportional to the square root of $D_{dot}$. However, it is considered that the independency is lost because of the influence of, for example, correlation between Si fine particles and hence fluctuation is not always proportional to the square root of $D_{dot}$. When increasing the random noise level, a scientifically desirable surface density range is determined, provided that the Fourier characteristic is proportional to $D_{dot}$. This desirable range includes the range determined on the assumption that the Fourier characteristic is proportional to the square root of $D_{dot}$. This is because an increase in the Fourier characteristic (coefficient) of random noise with respect to the surface density is smaller in the case where the Fourier characteristic is proportional to the square root of $D_{dot}$, than in the case where the Fourier characteristic is proportional to $D_{dot}$.

Figure 8:
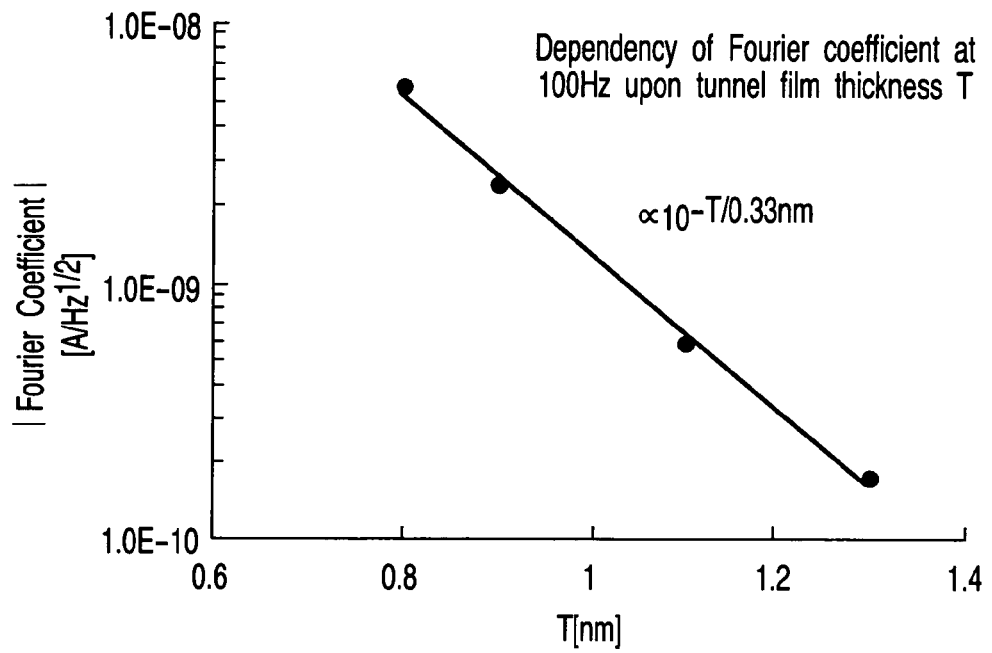
FIG. 8 is a graph illustrating the relationship between the Fourier coefficient at 100 Hz and tunnel insulation film thickness T, acquired from random number generating elements.

FIG. 8 shows the relationship between the Fourier coefficient at 100 Hz and tunnel oxide film thicknesses T (nm), acquired from the random number generating elements. It can be understood from FIG. 8 that the random noise Fourier characteristic is proportional to $10^{-T/0.33}$ provided $T \leq 1.3$ nm. The above-mentioned data items related to the first embodiment have been uniquely acquired by the inventor by the experiments.

The tunnel resistance $R_t$ varies exponentially in accordance with exp $(4\pi T(2 \, mH)^{1/2}/h)$ with respect to the thickness T of the tunnel insulation film, and the height H of the tunnel barrier (i.e., the energy difference between the vacuum level of the conduction band end of the channel semiconductor and that of the tunnel insulation film). In exp $(4\pi T(2 \, mH)^{1/2}/h)$, m represents the effective mass of a direct tunnel, π the circular constant, and h Plank's constant. The direct tunnel effective mass m is a value between the conduction band effective mass of the tunnel insulation film (in the case of a silicon oxide film, about ½ the electron stationary mass) and the conduction band effective mass of the channel semiconductor (in the case of silicon, about 0.19 times the electron rest mass). As the state approaches a direct tunneling easily occurring state, the direct tunnel effective mass m approaches the conduction band effective mass of the channel semiconductor. The direct tunnel effective mass in a state in which direct tunneling very easily occurs is about 0.3 times the electron rest mass (see, for example, T. Yoshida et al., Jpn. J. Appl. Phys. Vol. 31 (1995), L903).

The present embodiment aims to generate high-frequency noise. High-frequency noise can be easily realized as direct tunneling easily occurs. It is considered that the direct tunnel effective mass is about 0.3 times the electron rest mass. Since in an oxide film, H is about 3.1 eV, the tunnel resistance Rt varies in proportion to $10^{T/0.23}$ (T representing the thickness [nm] of the tunnel oxide film). From this and the results shown in FIG. 8, it can be understood that the random noise Fourier characteristic is substantially proportional to $Rt^{-2/3}$.

In the first embodiment, W=0.01 μm, i.e., 1/W is 10 times that of the reference random number generating element shown in FIGS. 4 and 5, and $D_{dot}$ (=1.7×10$^{12}$ cm$^{-2}$) is 6.8 times that of the reference. Further, in the first embodiment, since the tunnel insulation film is formed of SiN having a low tunnel barrier H of about 2 eV, $Rt^{-2/3}$ is determined from the above-mentioned exponential function to be about 3 times that of the reference. The random noise Fourier characteristic is proportional to 1/W, $D_{dot}$ and $Rt^{-2/3}$, and is in total 200 times that of the reference. Accordingly, 0.1% noise is contained at 1 MHz that is 200 times 5 kHz.

In the first embodiment, W (μm), $D_{dot}$ (×10$^{12}$ cm$^{-2}$), average particle diameter d (nm) and T (nm) are set to 0.01, 1.7, 8 and 0.8, respectively. However, they are not limited to these parameter values. The resistance Rt is proportional to exp $(4\pi T(2 \, mH)^{1/2}/h)$, and inversely proportional to the cross section $(\pi/4)d^2$ of each fine particle 26. Accordingly, in light of the fact that $Rt^{-2/3}$ is proportional to $d^{4/3}$ exp$(-8\pi T (2 \, mH)^{1/2}/3 \, h)$, if $D_{dot} \times d^{4/3}$ exp$(-T/0.189 \, nm)/W \geq (1.7 \times 8^{4/3}/0.01)$exp$(-0.8/0.189)(10^{12}$ cm$^{-2} \cdot nm^{4/3}/\mu m)=40$ (μm$^{-5/3}$), 0.1% or more of a 1-MHz random noise component can be acquired as long as the MOSFET is a thin-line MOSFET using a nitride thin film as the tunnel insulation film.

Further, although in the first embodiment, thermal nitrization is performed for forming a nitride thin film, another method, such as CVD, may be employed. Also, the tunnel insulation film may be formed of an insulation material other than the silicon nitride film 22 if the material has the same tunnel barrier height as the film 22, i.e., about 2 eV. Moreover, although Si nanocrystals are used as the conductive fine particles 26, other conductive material particles may be used. The fine semiconductor particles 76 may be regularly arranged in position. The control oxide film 23 may be formed of the same material as the tunnel insulation film or may be formed of another material. Furthermore, although the channel 21 has a thin-line portion, the entire channel may be formed of a thin line. In this case, the same advantage can be acquired.

In FIG. 2 or FIG. 3A, the thin-line portion is not strictly rectangular. This is because the corners of rectangular patterns are actually rounded. Even a random number generating element having a strictly rectangular thin-line portion is included in the scope of the present embodiment.

SECOND EMBODIMENT

A description will now be given of a random number generating element according to a second embodiment, in which a tunnel insulation film made of hafnium oxide (HfO$_2$) is formed on an SOI substrate.

FIGS. 9A to 9D illustrate processes for producing the random number generating element of the second embodiment.

Figure 9A:
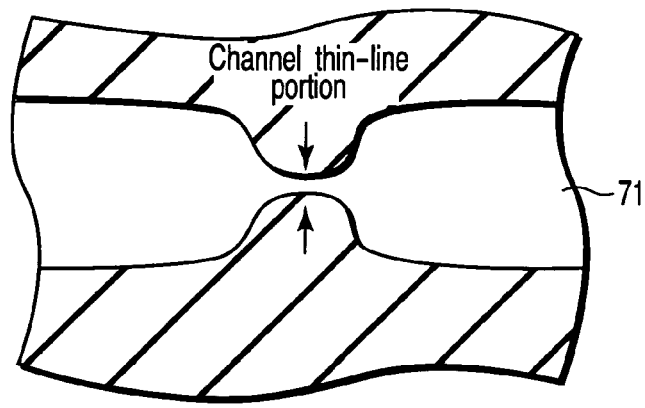
FIGS. 9A to 9D are views illustrating processes for producing a random number generating element according to a second embodiment.
Figure 9B:
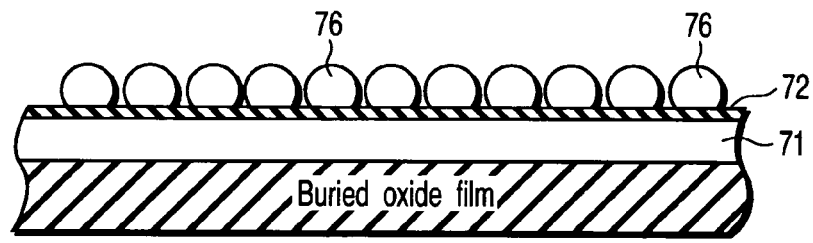

Firstly, as shown in the plan view of FIG. 9A, a channel thin-line portion pattern with a width of 0.015 μm and a length of 0.5 μm is formed in the surface of an SOI substrate 71 by lithography using electron beam (EB) or X-ray beam. Subsequently, a hafnium oxide (HfO$_2$) film 72 with a thickness T of 0.8 nm is formed on the resultant structure by sputtering using hafnium (Hf) as a target and a gas containing oxygen. On the hafnium oxide film 72, Si fine crystal particles 76 with an average particle diameter of about 8 nm are formed, by LPCVD, with a surface density of about 1.5×10$^{12}$ cm$^{-2}$ (FIG. 9B). At this time, the diameter of the particles 76 can be adjusted by adjusting the time of CVD, while the surface density can be adjusted by adjusting the temperature, the flow of material gas and the number of CVD applications.

Figure 9C:
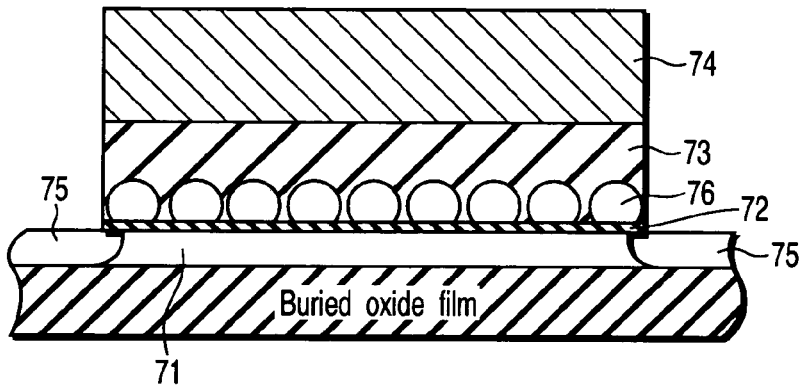
Figure 9D:
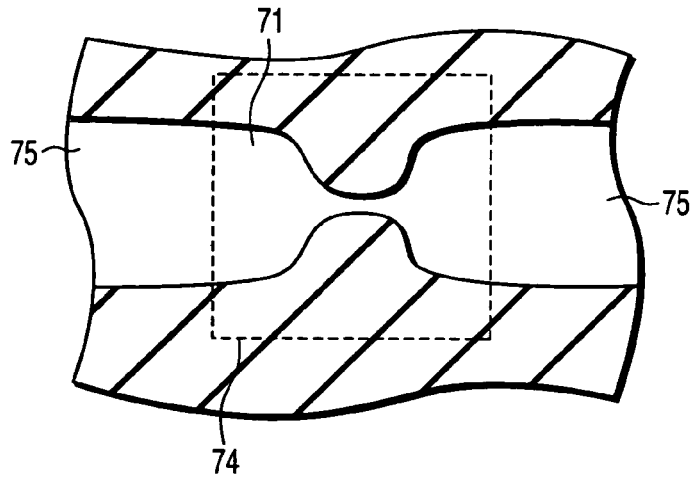

After that, as illustrated in FIGS. 9C and 9D, a control oxide film 73 with a thickness of 10 nm is formed by LPCVD. On the film 73, an n$^+$ polysilicon layer with a thickness of 200 nm is deposited by CVD. This layer is patterned using a resist pattern as a mask, thereby forming a gate electrode 74. Thereafter, phosphorus (P) is implanted in a concentration of $1 \times 10^{15}$ cm$^{-2}$ with an implantation energy of 15 KeV. The resultant structure is annealed at 1000° C. for 20 sec., thereby forming n$^+$ layers 75 serving as source/drain regions. The random number generating element produced by the above-described process can generate random noise containing 0.1% or more of a 1-MHz oscillation component.

In the reference random number generating element shown in FIGS. 4 and 5 where a 0.1% oscillation component occurs at 5 kHz, W is 0.1 μm and $D_{dot}$ is $2.5 \times 10^{11}$ cm$^{-2}$ on the SOI substrate. In contrast, in the random number generating element of the second embodiment, W is 0.015 μm and $D_{dot}$ is $1.5 \times 10^{12}$ cm$^{-2}$ on the SOI substrate. In other words, in the second embodiment, 1/W is 20/3 times and $D_{dot}$ is 6 times the corresponding values of the reference. Further, in the second embodiment, since the tunnel insulation film is formed of HfO$_2$ having a low tunnel barrier H of about 1.5 eV, Rt$^{-2/3}$ is determined from the above-mentioned exponential function to be about 5 times that of the reference. The random noise Fourier characteristic is proportional to 1/W, $D_{dot}$ and Rt$^{-2/3}$, and is in total 200 times that of the reference. Accordingly, a 0.1% noise component is contained at 1 MHz that is 200 times 5 kHz.

In the second embodiment, W (μm), $D_{dot}$ ($\times 10^{12}$ cm$^{-2}$), average particle diameter d (nm) and T (nm) are set to 0.015, 1.5, 8 and 0.8, respectively. However, they are not limited to these values. If $D_{dot} \times d^{4/3} \exp(-T/0.218$ nm$)/W \geq (1.5 \times 8^{4/3}/0.015) \exp(-0.8/0.218) (\times 10^{12}$ cm$^{-2} \cdot$nm$^{4/3}/$μm$) = 40$ (μm$^{-5/3}$), 0.1% or more of a 1-MHz random noise component can be acquired as long as the MOSFET is a thin-line MOSFET using a hafnium oxide thin film as the tunnel insulation film.

Further, although in the second embodiment, sputtering is performed using hafnium as a target and a gas containing oxygen for forming a HfO$_2$ film, another method, such as CVD or epitaxial growth, may be employed. Also, the tunnel insulation film may be formed of an insulation material other than HfO$_2$ if the material has the same tunnel barrier height as the HfO$_2$ film, i.e., about 1.5 eV. Moreover, although Si nanocrystals are used as the conductive fine particles, other conductive material particles may be used. The fine semiconductor particles 76 may be regularly arranged in position. The control oxide film 73 may be formed of the same material as the tunnel insulation film or may be formed of another material. Furthermore, although the channel has a thin-line portion, the entire channel may be formed of a thin line. In this case, too, the same advantage can be acquired.

THIRD EMBODIMENT

A description will be given of a random number generating element according to a third embodiment in which a tunnel insulation film made of cerium oxide (CeO$_2$) is formed on an SOI substrate.

FIGS. 10A to 10D illustrate processes for producing the random number generating element of the third embodiment.

Figure 10A:
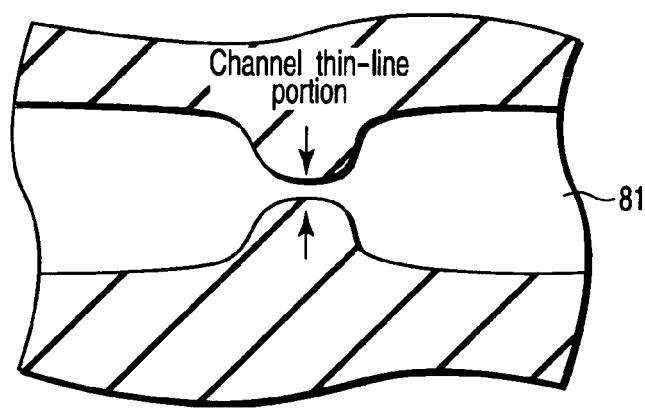
FIGS. 10A to 10D are views illustrating processes for producing a random number generating element according to a third embodiment.

Firstly, as shown in the plan view of FIG. 10A, a channel thin-line portion pattern with a width of 0.075 μm and a length of 0.5 μm is formed in the surface of an SOI substrate 81 by lithography using EB or X-ray beam.

Figure 10B:
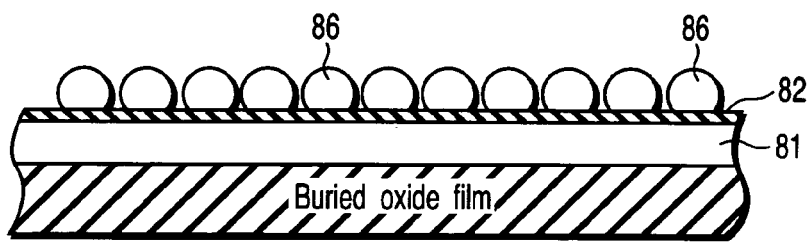

Subsequently, a cerium oxide (CeO$_2$) film 82 with a thickness T of 0.8 nm is formed on the resultant structure by sputtering using cerium (Ce) as a target and a gas containing oxygen. On the cerium oxide film 82, Si fine crystal particles 86 with an average particle diameter of about 8 nm are formed, by LPCVD, with a surface density of about $5 \times 10^{11}$ cm$^{-2}$ (FIG. 10B). At this time, the diameter of the particles 86 can be adjusted by adjusting the time of CVD, while the surface density can be adjusted by adjusting the temperature, the flow of material gas and the number of CVD applications.

Figure 10C:
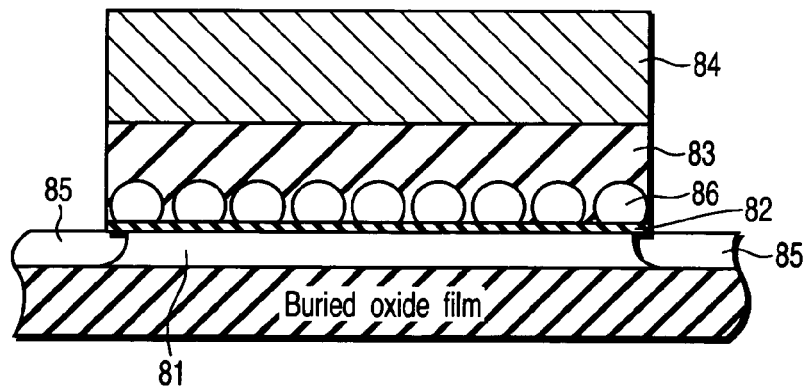
Figure 10D:
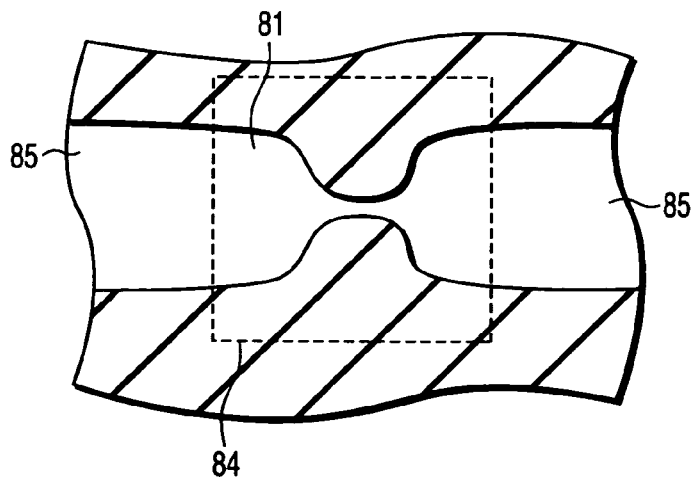

After that, as illustrated in FIGS. 10C and 10D, a control oxide film 83 with a thickness of 10 nm is formed by LPCVD. On the film 83, an n$^+$ polysilicon layer with a thickness of 200 nm is deposited by CVD. This layer is patterned using a resist pattern as a mask, thereby forming a gate electrode 84. Thereafter, phosphorus (P) is implanted in a concentration of $1 \times 10^{15}$ cm$^{-2}$ with an implantation energy of 15 KeV. The resultant structure is annealed at 1000° C. for 20 sec., thereby forming n$^+$ layers 85 serving as source/drain regions. Thus, a random number generating element is produced, which can generate random noise containing 0.1% or more of a 1-MHz oscillation component.

In the reference random number generating element shown in FIGS. 4 and 5, a 0.1% oscillation component occurs at 5 kHz. In the third embodiment, 1/W (W=0.075 μm) is 4/3 times and $D_{dot}$ ($5 \times 10^{11}$ cm$^{-2}$) is 2 times the corresponding values of the reference. Further, in the third embodiment, the tunnel insulation film is formed of CeO$_2$ having a low tunnel barrier H of about 0.1 eV, therefore Rt$^{-2/3}$ is determined from the above-mentioned exponential function to be about 75 times that of the reference. The random noise Fourier characteristic is proportional to 1/W, $D_{dot}$ and Rt$^{-2/3}$, and is in total 200 times that of the reference. Accordingly, a 0.1% noise component is contained at 1 MHz that is 200 times 5 kHz.

In the third embodiment, W (μm), $D_{dot}$ ($\times 10^{12}$ cm$^{-2}$), average particle diameter d (nm) and T (nm) are set to 0.075, 0.5, 8 and 0.8, respectively. However, they are not limited to these values. If $D_{dot} \times d^{4/3} \exp(-T/0.845$ nm$)/W \geq (0.5 \times 8^{4/3}/0.075) \exp(-0.8/0.845)(\times 10^{12}$ cm$^{-2} \cdot$nm$^{4/3}/$μm$) = 40$ (μm$^{-5/3}$), 0.1% or more of a 1-MHz random noise component can be acquired as long as the MOSFET is a thin-line MOSFET using a cerium oxide thin film as the tunnel insulation film.

Further, although in the third embodiment, sputtering is performed for forming a CeO$_2$ film, another method, such as CVD or epitaxial growth, may be employed. Also, the tunnel insulation film may be formed of an insulation material (TiO$_2$ or SrTiO$_3$) other than CeO$_2$ if the material has the same tunnel barrier height as the CeO$_2$ film, i.e., about 0.1 eV. Moreover, although Si nanocrystals are used as the conductive fine particles, other conductive material particles may be used. The fine semiconductor particles 86 may be regularly arranged in position. The control oxide film 83 may be formed of the same material as the tunnel insulation film 82 or may be formed of another material. Furthermore, although the channel has a thin-line portion, the entire channel may be formed of a thin line. In this case, too, the same advantage can be acquired.

FOURTH EMBODIMENT

A description will be given of a random number generating element according to a fourth embodiment in which a tunnel insulation film made of silicon oxide is formed on a bulk silicon substrate.

FIGS. 11A to 11D illustrate processes for producing the random number generating element of the fourth embodiment.

Figure 11A:
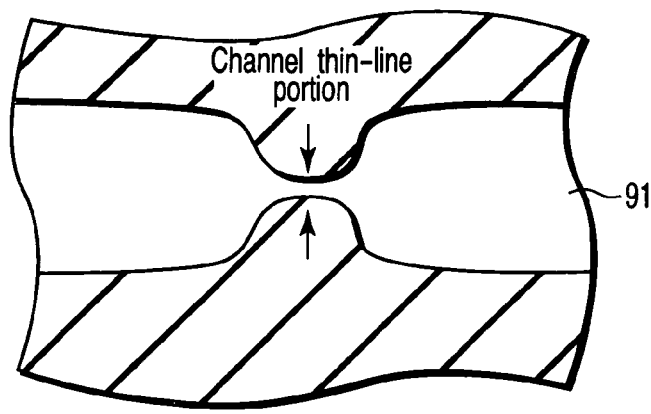
FIGS. 11A to 11D are views illustrating processes for producing a random number generating element according to a fourth embodiment.

Firstly, as shown in the plan view of FIG. 11A, a channel thin-line portion pattern with a width of 0.03 µm and a length of 0.5 µm is formed in the surface of a bulk silicon substrate 91 by trench element isolation and lithography using EB or X-ray beam.

Figure 11B:
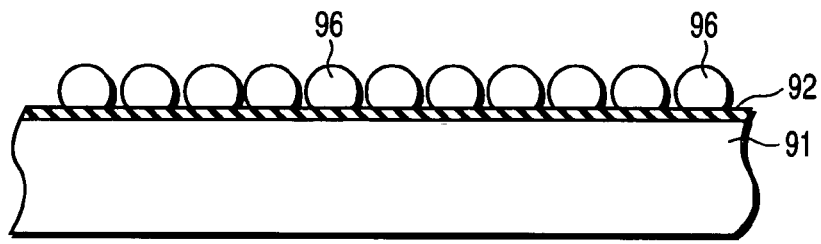

Subsequently, a silicon oxide film 92 with a thickness T of 0.8 nm is formed on the resultant structure by rapid thermal oxidation. On the silicon oxide film 92, Si fine crystal particles 96 with an average particle diameter of about 8 nm are formed, by LPCVD, with a surface density of about $5 \times 10^{11}$ cm$^{-2}$ (FIG. 11B). Also at this time, the particle diameter can be adjusted by adjusting the time of CVD, and the surface density can be adjusted by adjusting the temperature, the flow of material gas and the number of CVD applications.

Figure 11C:
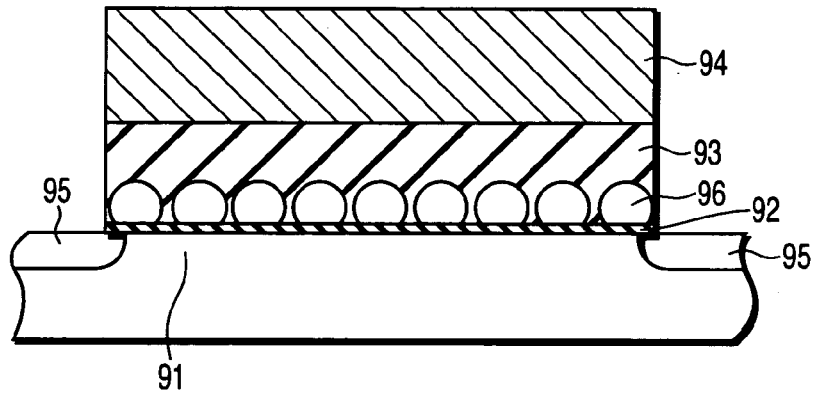
Figure 11D:
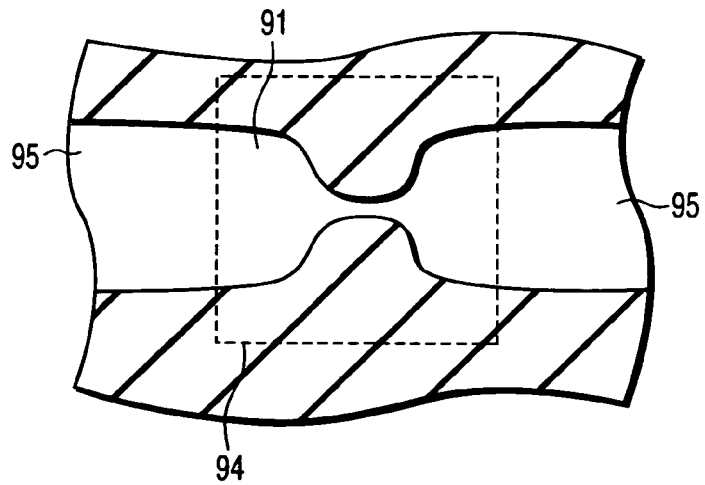

After that, as illustrated in FIGS. 11C and 11D, a control oxide film 93 with a thickness of 10 nm is formed by LPCVD. On the film 93, an n$^+$ polysilicon layer with a thickness of 200 nm is deposited by CVD. This layer is patterned using a resist pattern as a mask, thereby forming a gate electrode 94. Thereafter, phosphorus (P) is implanted in a concentration of $1 \times 10^{15}$ cm$^{-2}$ with an implantation energy of 15 KeV. The resultant structure is annealed at 1000° C. for 20 sec., thereby forming n$^+$ layers 95 serving as source/drain regions. Thus, a random number generating element is produced, which can generate random noise containing 0.1% or more of a 1-MHz oscillation component.

The reason why the random number generating element of the fourth embodiment contains 0.1% or more of a 1-MHz random oscillation component will be described.

Figure 12:
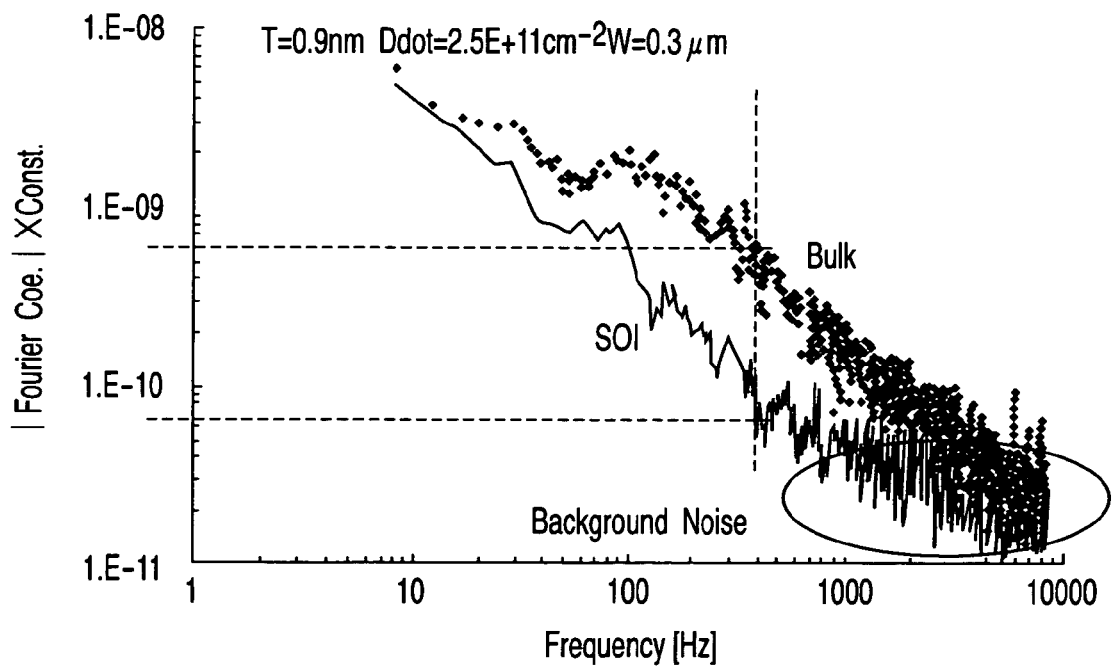
FIG. 12 is a graph useful in comparing experimental results concerning a bulk substrate and SOI. substrate in which W=0.3 μm, $D_{dot}=2.5 \times 10^{11}$ $cm^{-2}$ and Rt (a tunnel silicon oxide film of 0.9 nm)

FIG. 12 is a graph useful in comparing experimental results concerning a bulk substrate and SOI substrate in which W=0.3 µm, $D_{dot}=2.5 \times 10^{11}$ cm$^{-2}$ and Rt (a tunnel silicon oxide film of 0.9 nm).

As is evident from FIG. 12, in the fourth embodiment using the bulk substrate, the random noise Fourier characteristic is about 10 times that acquired from the SOI substrate. This difference occurs because in the SOI substrate, the flow of carriers is interrupted by its buried oxide film. In other words, a difference of 10 times can be caused in random noise Fourier characteristic by a change in the carrier supply/absorb mechanism in the substrate. The results shown in FIG. 12 have been acquired from unique experiments by the inventor of the present embodiment.

In the reference random number generating element shown in FIGS. 4 and 5, a 0.1% oscillation component occurs at 5 kHz. In contrast, in the fourth embodiment, 1/W (W=0.03 µm) is 10/3 times and $D_{dot}(1.5 \times 10^{12}$ cm$^{-2})$ is 6 times the corresponding values of the reference. Further, the bulk substrate provides a random noise Fourier characteristic value 10 times that acquired from the SOI substrate. In total, the random noise Fourier characteristic is 200 times that of the reference. Accordingly, a 0.1% noise component is contained at 1 MHz that is 200 times 5 kHz.

In the fourth embodiment, W (µm), $D_{dot}(10^{12}$ cm$^{-2})$, average particle diameter d (nm) of Si fine particles 96 and T (nm) are set to 0.03, 1.5, 8 and 0.8, respectively. However, they are not limited to these values. Pay attention to the resistance $Rt^{-2/3} \propto d^{4/3} \exp(-8\pi T(2 \text{ mH})^{1/2}/3 \text{ h})$ between the channel and fine particles. If $(D_{dot} \times d^{4/3}/W)\exp(-T/0.152 \text{ nm})/W \geq (1.5 \times 8^{4/3}/0.03)\exp(-0.8/0.152)(10^{12}$ cm$^{-2}$ nm$^{4/3}$/µm$) = 4(\mu\text{m}^{-5/3})$, 0.1% or more of a 1-MHz random noise component can be acquired as long as the MOSFET is a thin-line MOSFET formed on a bulk substrate that uses an oxide thin film as the tunnel insulation film.

Further, although in the fourth embodiment, Rapid thermal oxidation (RTO) is performed for forming a tunnel oxide film, another method, such as CVD or natural oxidation, may be employed. Although Si nanocrystals are used as the conductive fine particles 96, other conductive material particles may be used. The fine semiconductor particles 96 may be regularly arranged in position. The control oxide film 93 may be formed of the same material as the tunnel insulation film 92 or may be formed of another material. Furthermore, although the channel has a thin-line portion, the entire channel may be formed of a thin line. In this case, too, the same advantage can be acquired.

FIFTH EMBODIMENT

A description will be given of a random number generating element according to a fifth embodiment in which a tunnel insulation film made of silicon nitride is formed on a bulk silicon substrate.

FIGS. 13A to 13D illustrate processes for producing the random number generating element of the fifth embodiment.

Figure 13A:
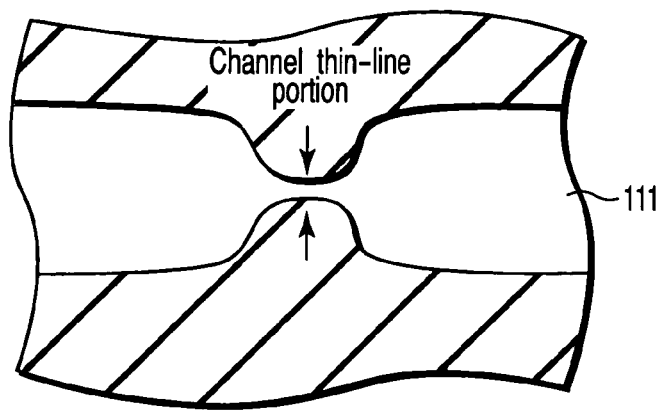
FIGS. 13A to 13D are views illustrating processes for producing a random number generating element according to a fifth embodiment.
Figure 13B:
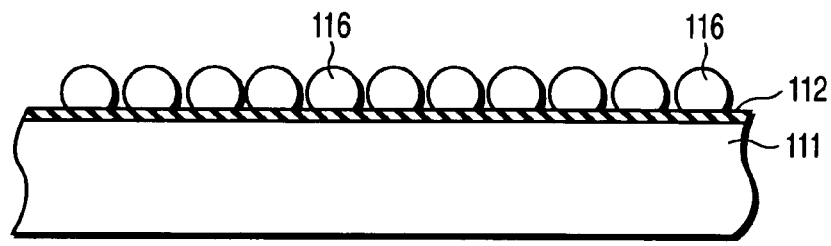

Firstly, as shown in the plan view of FIG. 13A, a channel thin-line portion pattern with a width of 0.1 µm and a length of 0.5 µm is formed in the surface of a bulk silicon substrate 111 by trench element isolation and lithography using EB or X-ray beam. Subsequently, a thermal nitride film 112 with a thickness T of 0.8 nm is formed on the resultant structure by thermal nitrization using NH$_3$. On the nitride film 112, Si fine crystal particles 116 with an average particle diameter of about 8 nm are formed, by LPCVD, with a surface density of about $1.7 \times 10^{12}$ cm$^{-2}$ (FIG. 13B). Also at this time, the particle diameter can be adjusted by adjusting the time of CVD, and the surface density can be adjusted by adjusting the temperature, the flow of material gas and the number of CVD applications.

Figure 13C:
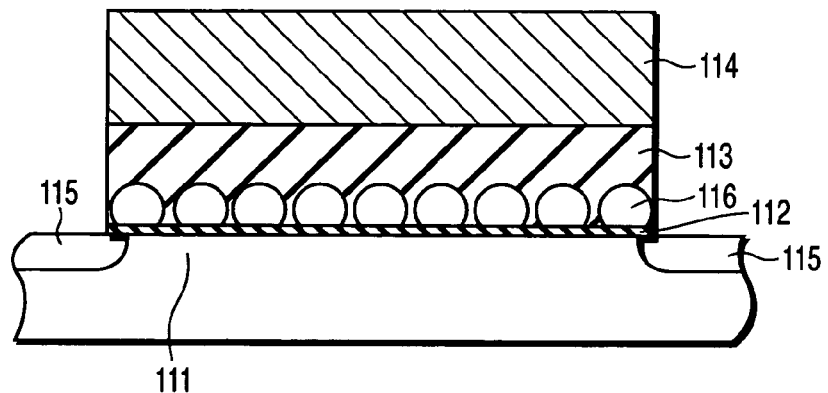
Figure 13D:
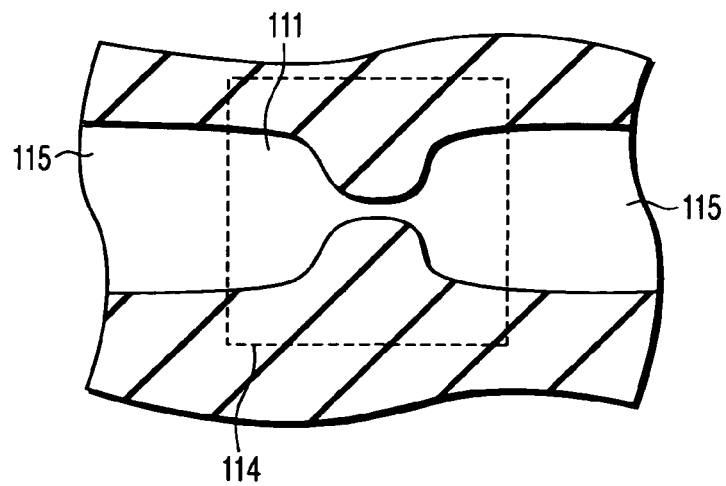

After that, as illustrated in FIGS. 13C and 13D, a control oxide film 113 with a thickness of 10 nm is formed by LPCVD. On the film 113, an n$^+$ polysilicon layer with a thickness of 200 nm is deposited by CVD. This layer is patterned using a resist pattern as a mask, thereby forming a gate electrode 114. Thereafter, phosphorus (P) is implanted in a concentration of $1 \times 10^{15}$ cm$^{-2}$ with an implantation energy of 15 KeV. The resultant structure is annealed at 1000° C. for 20 sec., thereby forming n$^+$ layers 115 serving as source/drain regions. Thus, a random number generating element is produced, which can generate random noise containing 0.1% or more of a 1-MHz oscillation component.

The reason why the random number generating element of the fifth embodiment contains 0.1% or more of a 1-MHz random oscillation component will be described. In the reference random number generating element formed on an SOI substrate and shown in FIGS. 4 and 5, a 0.1% oscillation component occurs at 5 kHz. In contrast, in the fifth embodiment, 1/W (W=0.1 µm) is the same as and $D_{dot}$ $(1.7 \times 10^{12}$ cm$^{-2})$ is 6.8 times the corresponding values of the reference. Further, since the tunnel insulation film is formed of SiN having a low tunnel barrier H of about 2 eV, $Rt^{-2/3}$ is about 3 times that of the reference. Furthermore, as in the fourth embodiment, the bulk substrate of the fifth embodiment also provides a random noise Fourier characteristic value 10 times that acquired from the SOI substrate. In total, the random noise Fourier characteristic is 200 times that of the reference. Accordingly, a 0.1% noise component is contained at 1 MHz that is 200 times 5 kHz.

In the fifth embodiment, W (µm), $D_{dot}(10^{12}$ cm$^{-2})$, average particle diameter d (nm) of the Si fine particles and T (nm) are set to 0.1, 1.7, 8 and 0.8, respectively. However, they are not limited to these values. If $D_{dot} \times d^{4/3} \exp(-T/0.189 \text{ nm})/W \geq (1.7 \times 8^{4/3}/0.1)\exp(-0.8/0.189)(\times 10^{12}$ cm$^{-2}$·nm$^{4/3}$/µm$) = 4$ (µm$^{-5/3}$), 0.1% or more of a 1-MHz random noise component can be acquired as long as the MOSFET is a thin-line MOSFET formed on a bulk substrate that uses a nitride thin film as the tunnel insulation film.

Further, although in the fifth embodiment, thermal nitrization is performed for forming a tunnel nitride film, another method, such as CVD, may be employed. Although Si nanocrystals are used as the conductive fine particles 116, other conductive material particles may be used. The fine semiconductor particles 116 may be regularly arranged in position. The control oxide film 113 may be formed of the same material as the tunnel insulation film 112 or may be formed of another material. Furthermore, although the channel has a thin-line portion, the entire channel may be formed of a thin line. In this case, too, the same advantage can be acquired.

SIXTH EMBODIMENT

A description will be given of a random number generating element according to a sixth embodiment in which a tunnel insulation film made of hafnium oxide ($HfO_2$) is formed on a bulk silicon substrate.

FIGS. 14A to 14D illustrate processes for producing the random number generating element of the sixth embodiment.

Figure 14A:
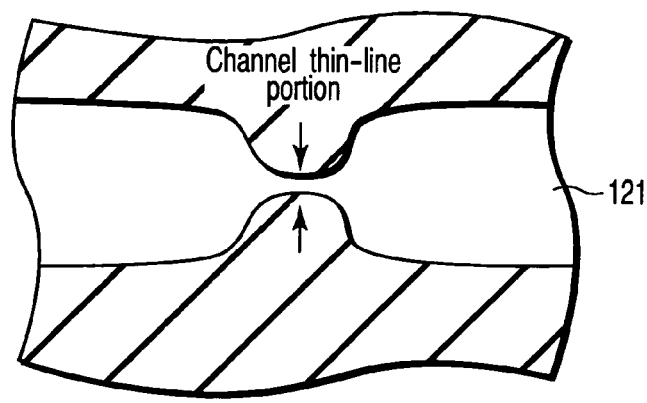
FIGS. 14A to 14D are views illustrating processes for producing a random number generating element according to a sixth embodiment.

Firstly, as shown in the plan view of FIG. 14A, a channel thin-line portion pattern with a width of 0.15 μm and a length of 0.5 μm is formed in the surface of a bulk silicon substrate 121 by trench element isolation and lithography using EB or X-ray beam.

Figure 14B:
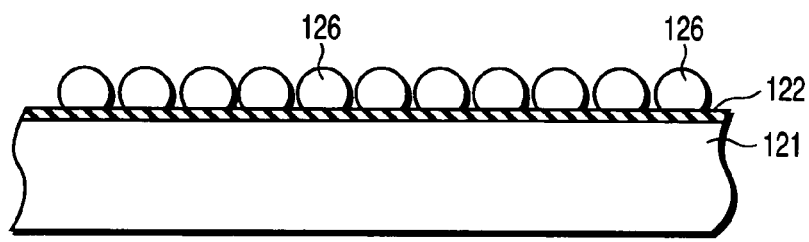

Subsequently, a hafnium oxide ($HfO_2$) film 122 with a thickness T of 0.8 nm is formed on the resultant structure by sputtering using Hf as a target and a gas containing oxygen. On the oxide film 122, Si fine crystal particles 126 with an average particle diameter of about 8 nm are formed, by LPCVD, with a surface density of about $1.5 \times 10^{12}$ $cm^{-2}$ (FIG. 14B). Also at this time, the particle diameter can be adjusted by adjusting the time of CVD, and the surface density can be adjusted by adjusting the temperature, the flow of material gas and the number of CVD applications.

Figure 14C:
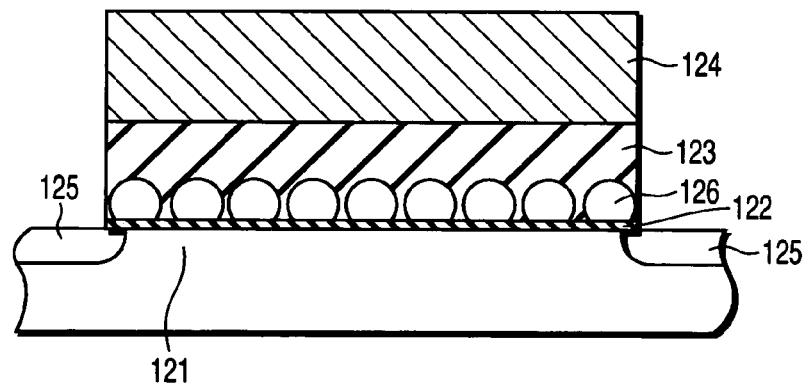
Figure 14D:
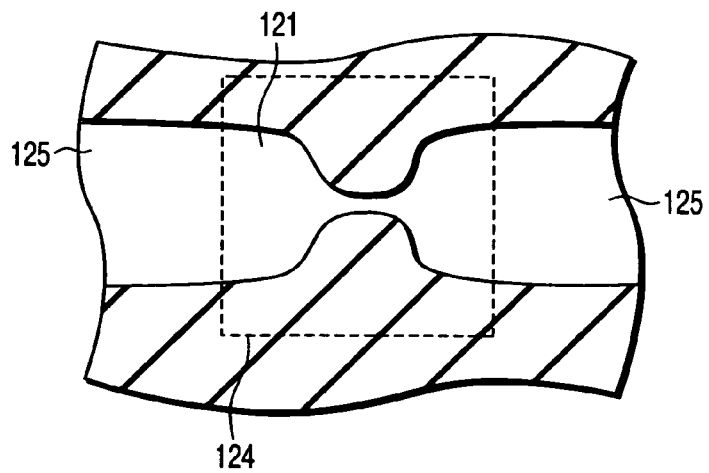

After that, as illustrated in FIGS. 14C and 14D, a control oxide film 123 with a thickness of 10 nm is formed by LPCVD. On the film 123, an n$^+$ polysilicon layer with a thickness of 200 nm is deposited by CVD. This layer is patterned using a resist pattern as a mask, thereby forming a gate electrode 124. Thereafter, phosphorus (P) is implanted in a concentration of $1 \times 10^{15}$ $cm^{-2}$ with an implantation energy of 15 KeV. The resultant structure is annealed at 1000° C. for 20 sec., thereby forming n$^+$ layers 125 serving as source/drain regions. Thus, a random number generating element is produced, which can generate random noise containing 0.1% or more of a 1-MHz oscillation component.

The reason why the random number generating element of the sixth embodiment contains 0.1% or more of a 1-MHz random oscillation component will be described. In the reference random number generating element formed on an SOI substrate and shown in FIGS. 4 and 5, a 0.1% oscillation component occurs at 5 kHz. In contrast, in the sixth embodiment, 1/W (W=0.15 μm) is 3/2 times and $D_{dot}$ ($1.5 \times 10^{12}$ $cm^{-2}$) is 6 times the corresponding values of the reference. Further, since the tunnel insulation film is formed of $HfO_2$ having a low tunnel barrier H of about 1.5 eV, Rt is about 5 times that of the reference. Furthermore, as in the fourth embodiment, the bulk substrate of the sixth embodiment also provides a random noise Fourier characteristic value 10 times that acquired from the SOI substrate. Therefore, the total random noise Fourier characteristic value is 200 times that of the reference. Accordingly, a 0.1% noise component is contained at 1 MHz that is 200 times 5 kHz.

In the sixth embodiment, W (μm), $D_{dot}$ ($10^{12}$ $cm^{-2}$), average particle diameter d (nm) of the Si fine particles 126 and T (nm) are set to 0.15, 1.5, 8 and 0.8, respectively. However, they are not limited to these values. If $D_{dot} \times d^{4/3} \exp(-T/0.218$ nm$)/W \geqq (1.5 \times 8^{4/3}/0.15) \exp(-0.8/0.218)(10^{12}$ $cm^{-2} \cdot nm^{4/3}/$μm$) = 4($μm$^{-5/3})$, 0.1% or more of a 1-MHz random noise component can be acquired as long as the MOSFET is a thin-line MOSFET formed on a bulk substrate that uses a $HfO_2$ film as the tunnel insulation film.

Further, although in the sixth embodiment, sputtering is performed for forming a tunnel $HfO_2$ film, another method, such as CVD or epitaxial growth, may be employed. Although Si nanocrystals are used as the conductive fine particles 126, other conductive material particles may be used. The fine semiconductor particles 126 may be regularly arranged in position. The control oxide film 123 may be formed of the same material as the tunnel insulation film 122 or may be formed of another material. Furthermore, although the channel 121 has a thin-line portion, the entire channel may be formed of a thin line. In this case, too, the same advantage can be acquired.

SEVENTH EMBODIMENT

A description will be given of a random number generating element according to a seventh embodiment in which a tunnel insulation film made of cerium oxide ($CeO_2$) is formed on a bulk silicon substrate.

FIGS. 15A to 15D illustrate processes for producing the random number generating element of the seventh embodiment. Firstly, as shown in the plan view of FIG. 15A, a channel thin-line portion pattern with a width of 0.3 μm and a length of 0.5 μm is formed in the surface of a bulk silicon substrate 131 by trench element isolation and lithography using EB or X-ray beam.

Subsequently, a cerium oxide ($CeO_2$) film 132 with a thickness T of 1 nm is formed on the resultant structure by sputtering using Ce as a target and a gas containing oxygen. On the oxide film 132, Si fine crystal particles 136 with an average particle diameter of about 8 nm are formed, by LPCVD, with a surface density of about $2.5 \times 10^{11}$ $cm^{-2}$ (FIG. 15B). Also at this time, the particle diameter can be adjusted by adjusting the time of CVD, and the surface density can be adjusted by adjusting the temperature, the flow of material gas and the number of CVD applications.

After that, as illustrated in FIGS. 15C and 15D, a control oxide film 133 with a thickness of 10 nm is formed by LPCVD. On the film 133, an n$^+$ polysilicon layer with a thickness of 200 nm is deposited by CVD. This layer is patterned using a resist pattern as a mask, thereby forming a gate electrode 134. Thereafter, phosphorus (P) is implanted in a concentration of $1 \times 10^{15}$ $cm^{-2}$ with an implantation energy of 15 KeV. The resultant structure is annealed at 1000° C. for 20 sec., thereby forming n$^+$ layers 135 serving as source/drain regions. Thus, a random number generating element is produced, which can generate random noise containing 0.1% or more of a 1-MHz oscillation component.

The reason why the random number generating element of the seventh embodiment contains 0.1% or more of a 1-MHz random oscillation component will be described.

In the reference random number generating element formed on an SOI substrate and shown in FIGS. 4 and 5, a 0.1% oscillation component occurs at 5 kHz. In contrast, in the seventh embodiment, 1/W (W=0.3 μm) is 1/3 times the corresponding value of the reference, and $D_{dot}$ ($2.5 \times 10^{11}$ $cm^{-2}$) is the same as the corresponding value of the reference. Further, since the tunnel insulation film is formed of Ce $O_2$ having a low tunnel barrier H of about 0.1 eV and has a thickness T of 1 nm, $Rt^{-2/3}$ is determined from the aforementioned exponential function to be about 60 times that of the reference. Furthermore, as in the fourth embodiment, the bulk substrate of the sixth embodiment also provides a random noise Fourier characteristic value 10 times that acquired from the SOI substrate. Therefore, the total random noise Fourier characteristic value is 200 times that of the reference. Accordingly, a 0.1% noise component is contained at 1 MHz that is 200 times 5 kHz.

In the seventh embodiment, W (μm), $D_{dot}$ ($10^{12}$ $cm^{-2}$), average particle diameter d (nm) of the Si fine particles and T (nm) are set to 0.3, 0.25, 8 and 1, respectively. However, they are not limited to these values. If $D_{dot} \times d^{4/3} \exp(-T/0.845 \text{ nm})/W \geq (0.25 \times 8^{4/3}/0.3) \exp(-1/0.845)(\times 10^{12} \text{ cm}^{-2} \cdot \text{nm}^{4/3}/\mu\text{m}) = 4$ $(\mu m^{-5/3})$, 0.1% or more of a 1-MHz random noise component can be acquired as long as the MOSFET is a thin-line MOSFET formed on a bulk substrate that uses a $CeO_2$ film as the tunnel insulation film.

Further, although in the seventh embodiment, sputtering is performed for forming a tunnel $CeO_2$ film, another method, such as CVD or epitaxial growth, may be employed. Although Si nanocrystals are used as the conductive fine particles 136, other conductive material particles may be used. The fine semiconductor particles 136 may be regularly arranged in position. The control oxide film 133 may be formed of the same material as the tunnel insulation film 132 or may be formed of another material. Furthermore, although the channel 131 has a thin-line portion, the entire channel may be formed of a thin line. In this case, too, the same advantage can be acquired.

The present embodiment is not limited to the above-described first to seventh embodiments. For example, although silicon is used as a main semiconductor material in the first to seventh embodiments, another semiconductor material may be used. Further, even if some Si fine crystal particles contact each other, this does not degrade the performance of the random number generating element, since electrons can stay in individual crystal particles.

Figure 17:
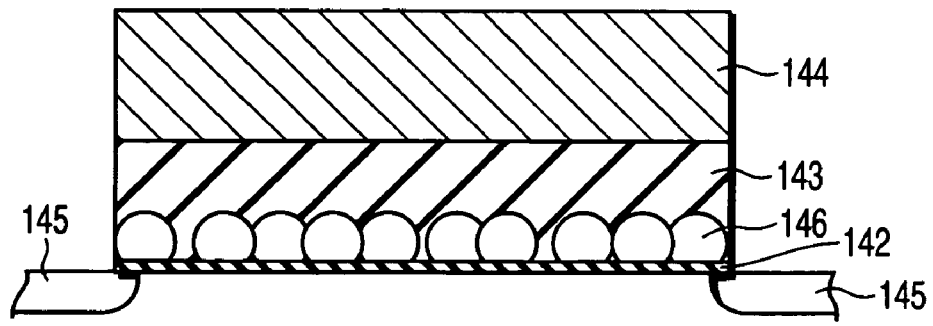
FIG. 17 is a sectional view illustrating a random number generating element in which adjacent conductive fine particles contact each other.
Figure 18:
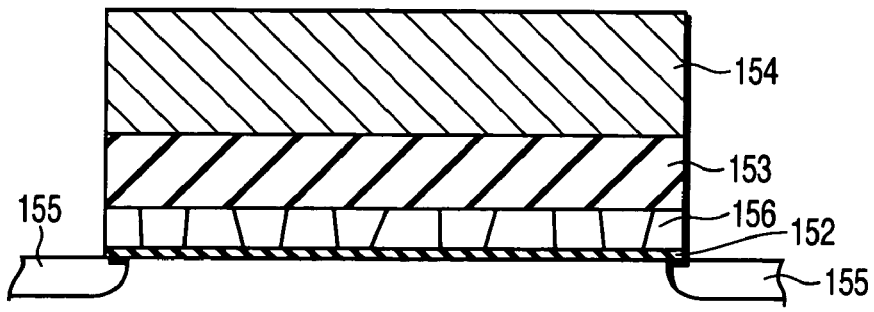
FIG. 18 is a sectional view illustrating a random number generating element in which adjacent conductive fine particles contact each other and form a polycrystalline layer.

Although in each embodiment of the invention, although the conductive fine particles are discretely distributed on the channel surface, most adjacent conductive fine particles may contact each other as shown in FIG. 17, or adjacent conductive fine particles that contact each other may form a polycrystalline film as shown in FIG. 18. Theses cases can provide the same effect as that of the case where fine particles are arranged discretely, since in each case, electrons locally flow between the conductive fine particles and channel. The cases where adjacent conductive fine particles contact each other are more advantageous since the surface density can be increased.

The tunnel insulation film may be formed of a material or may have a thickness other than those specified in the first to seventh embodiments. Also in this case, the same advantage can be acquired.

As is evident from FIGS. 6 to 8, random noise increases in proportion to $D_{dot} \times Rt^{-2/3}/W$, provided $W \leq 0.3$ m and $D_{dot} \geq 2.5 \times 10^{11}$ $cm^{-2}$. Rt exponentially depends upon film thickness T and barrier height H, and is inversely proportional to the cross section of each Si crystal particle, and therefore $Rt \propto d^{-2} \times \exp(4\pi T(2 \text{ mH})^{1/2}/h)$ (d: average diameter of Si fine crystal particles; π: circular constant; h: Plank's constant; m: tunnel effective mass that is about 0.3 times the electron rest mass).

Accordingly, the random noise Fourier characteristic is proportional to the value given by $$(D_{dot} \times d^{4/3}/W) \times \exp(-8\pi T(2 \text{ mH})^{1/2}/3 \text{ h})$$

In the SOI element shown in FIGS. 4 and 5, since W=0.1 μm, $D_{dot}$=2.5×$10^{11}$ $cm^{-2}$, d=8 nm, T=0.8 nm and H=3.1 eV (oxide film), $(D_{dot} \times d^{4/3}/W) \times \exp(-8\pi T(2 \text{ mH})^{1/2}/3 \text{ h}) \cong 0.2$ $(\mu m^{-5/3})$. At this time, 0.1% random noise is acquired at 5 kHz. Therefore, if $(D_{dot} \times d^{4/3}/W) \times \exp(-8\pi T(2 \text{ mH})^{1/2}/3 \text{ h}) \geq 40(\mu m^{-5/3})$ to make the random noise Fourier characteristic 200 times or more 5 kHz, 0.1% or more of 1-MHz random noise can be contained even in the case where a material and/or film thickness different from those is used.

Further, when a substrate structure, such as a bulk substrate, which differs from an SOI substrate, is employed and therefore a different carrier supply/absorb mechanism is used, the random noise Fourier characteristic is 10 times that acquired from the case of using an SIO substrate, as is shown in FIG. 12. Accordingly, in a substrate structure such as a bulk substrate, if $(D_{dot} \times d^{4/3}/W) \times \exp(-8\pi T(2 \text{ mH})^{1/2}/3 \text{ h}) \geq 4(\mu m^{-5/3})$ that is one-tenth of the above, 0.1% or more of 1-MHz random noise can be contained even where a material and/or film thickness different from those is used.

The substrate structure means here a structure as seen from the carrier supply/absorb mechanism of a substrate, therefore is not always defined by the substrate itself. For example, if a body contact is formed in an SOI substrate, this substrate is closer to a bulk substrate, in which the channel communicates with the substrate electrode, than standard SOI substrates in which the channel portion is floating. In contrast, if a bulk substrate has a channel in an isolated diffusion layer well, it is closer to the standard SOI substrates in which the channel portion is floating.

A description will now be given of effective ranges for structural parameters employed in the random number generating elements of the embodiment.

Concerning surface density $D_{dot}$, it is desirable that the coulomb force of conductive fine particles be transmitted to the entire channel surface. To this end, it is desirable that an area of 20 nm×20 nm, 20 nm being twice the screening length, contains one fine particle on the average. This density corresponds to a surface density of 2.5×$10^{11}$ $cm^{-2}$ or more. Further, in light of the condition that at least one fine particle must exist in each area of 20 nm×20 nm, it is desirable that the average diameter of fine particles be 20 nm or less.

To enable conductive fine particles to significantly contribute to current fluctuations, it is necessary to make electrons flow between the conductive fine particles and channel utilizing thermal fluctuations. If as many energy levels as possible exist at the conductive fine particle side within a thermal fluctuation energy range around 300 KeV (≅26m eV), a large number of electrons flow. In light of this, it is desirable that the diameter of each conductive fine particle is set so that a standard energy of $h^2/8mc$ $d^2$ (mc represents the effective mass of each conductive fine particle at the conduction band end), which is typical energy for locking up quantum, is lower than 26m eV. In other words, the desirable lower limit of particle diameter d is determined from the condition $h^2/8m$ $cd^2 < 26m$ eV. This corresponds to the condition d (particle diameter) > 5 nm in the case of Si fine particles. If another material is used, the diameter condition varies in accordance with the value of mc. However, in the present embodiment, particle diameter d is within a range of about 5 to 20 nm, and typically about 10 nm.

On the other hand, the upper limit of surface density $D_{dot}$ is $4/\pi \times d^{-2}$, which is the reciprocal of the average cross section and determined physically. Since the lower limit of d is about 5 nm, the upper limit of $D_{dot}$ is 4×$10^{12}$ $cm^{-2}$. In other words, the optimal range of surface density $D_{dot}$ is (0.25 to 4)×$10^{12}$ $cm^{-2}$, and its typical value is 1×$10^{12}$ $cm^{-2}$.

Concerning the lower limit of the width W of the channel thin-line portion, it can be said that the thinner, the better. However, if W=0.01 μm=10 nm (screening length), the coulomb force of any electron in the conductive fine particles on the channel thin-line portion covers the entire channel width. Therefore, even if W<0.01 μm, random noise is not sufficiently improved, which means that it is not so useful to set W<0.01 μm.

On the other hand, the desirable upper limit of the width W of the channel thin-line portion can be determined based on a 0.1% current fluctuation component, acquisition of which is the object of the present embodiment. Specifically, fluctuations in drain current are caused by changes in current that occur when electrons enter the conductive fine particles. When one electron enters one conductive fine particle, a circular region with a radius of 10 nm (coulomb cover length), which no carrier electrons can enter, is formed on the channel surface. A remarkable effect can be acquired if a change in the resistance of the channel thin-line portion due to this circular region is 0.1% or more.

Assuming here that the sheet resistance per unit gate width and unit gate length is ρ (the unit of resistance is, for example, Ω), the inherent resistance R of the channel thin-line portion is $R=\rho \cdot (L/W)$ Resistance Re occurring when one non-conductive region of radium r (=10 nm: coulomb cover length) is formed on the channel surface is given by $$Re = \rho[(L-2r)/W] + \rho \times \int_{-r}^{r} dx/[W - 2(r^2 - x^2)^{1/2}]$$

Assuming that W≧r, formula 1 is approximated. Then, resistance Re is given by $$Re = \rho \cdot (L/W)(1 + \pi r^2/LW) + O((r/W)^3)$$

The condition for enabling one electron to provide 0.1% or more of a current fluctuation component is given by $$\pi r^2/LW \geq 1/1000$$

From the above, the following is acquired:

$$LW \leq 1000 \times \pi r^2 = \pi/10 (\mu m^2)$$

In other words:

(The area of the channel thin-line portion)≦(The area of the coulomb repulsive region caused by one electron)×1000

Similarly, the desirable upper limit of tunnel insulation film thickness T can be determined in accordance with the above-described condition for acquiring a 0.1% current fluctuation component using one electron, and the condition that the area of the channel thin-line portion is $\pi/10$ ($\mu m^2$) or less.

Since the upper limit of $D_{dot}$ is $4\times 10^{12}$ $cm^{-2}$, the upper limit of the number of total conductive fine particles in the channel thin-line portion is $4000 \times \pi \approx 12560$. To obtain a 0.1% current fluctuation component, it is sufficient if only a single electron enters a single conductive fine particle. Accordingly, if the tunnel probability $\exp(-4\pi T(2 mH)^{1/2}/h) \geq 1/12560$, a 0.1% current fluctuation component can be effectively acquired. From this, a desirable upper limit of tunnel insulation film thickness T can be determined.

In a silicon oxide film, since H=3.1 eV, T≦0.95 nm. In a silicon nitride film (H=2 eV), T≦1.2 nm. In a hafnium oxide (HfO$_2$) film (H=1.5 eV), T≦1.35 nm. In a cerium oxide (CeO$_2$) film (H=0.1 eV), T≦5.3 nm.

There is another condition for determining another desirable upper limit of tunnel insulation film thickness T. Fluctuation of energy in the channel surface due to the elementary charge in the conductive fine particles is reduced in accordance with a coulomb rule, $q/4\pi \in T$, concerning film thickness T. "∈" represents the dielectric constant of the tunnel insulation film. Unless the magnitude of the energy fluctuation is higher than a thermal energy of 300 K (≅26m eV) at room temperature, the electrons captured in the conductive fine particles do not influence the channel current. In light of this, a more desirable upper limit of tunnel insulation film thickness T is determined using the condition $q/4\pi \in T \geq 26mV$.

It is a matter of course that the lower one of the upper limit based on tunnel barrier H and the upper limit based on the dielectric constant is a desirable upper limit. In a silicon oxide film, since $\in = 3.9 \cdot \in_o$ ($\in_o$ is a dielectric constant in the vacuum atmosphere), the upper limit based on the dielectric constant is 14 nm. Therefore, an upper limit of 0.95 nm based on barrier height H is preferable.

In a silicon nitride film, $\in = 7.5 \cdot \in_o$, therefore the upper limit based on the dielectric constant is 7.5 nm. Accordingly, an upper limit of 1.2 nm based on barrier height H is preferable.

In a hafnium oxide (HfO$_2$) film, $\in = 20 \cdot \in_o$, therefore the upper limit based on the dielectric constant is 2.8 nm. Accordingly, an upper limit of 1.2 nm based on barrier height H is preferable.

In a cerium oxide (CeO$_2$) film, $\in = 26 \cdot \in_o$, therefore the upper limit based on the dielectric constant is 2 nm. This upper limit is preferable to an upper limit of 4.5 nm based on barrier height H.

It is desirable that tunnel insulation film thickness T be as thin as possible. However, the lower limit of thickness T is about 0.3 nm, which corresponds to a one-atom film thickness.

From the physical lower limit of thickness T, the number LWD$_{dot}$ of total conductive fine particles in the channel thin-line portion is determined. From (tunnel probability)≧ 1/LWD$_{dot}$, which is one of the previously described desirable conditions, LWD$_{dot}$≧$\exp(0.3 nm \times (4\pi(2 mH)^{1/2}/h))$. That is, sufficient effect cannot be acquired unless the total conductive fine particles are at least 20, 11, 7 and 2 in the silicon oxide film, silicon nitride film, HfO$_2$ film and CeO$_2$ film, respectively.

It is desirable that the energy barrier height H of the tunnel insulation film be as thin as possible. In the silicon oxide film, which is most reliable, energy barrier height H is 3.1 eV or less. However, if energy barrier height H is reduced to a thermal energy of about 300 K (≅26 meV) at room temperature, charge/discharge of electrons via the tunnel insulation film includes that of electrons beyond the barrier due to the thermal energy, in addition to that of electrons due to the tunnel effect resulting from the fact that the amplitude of a wave function is not zero even in the barrier. However, even in such a case, the above-described conditions can be used as sufficient conditions, and hence be applied in the present embodiment.

Figure 19:
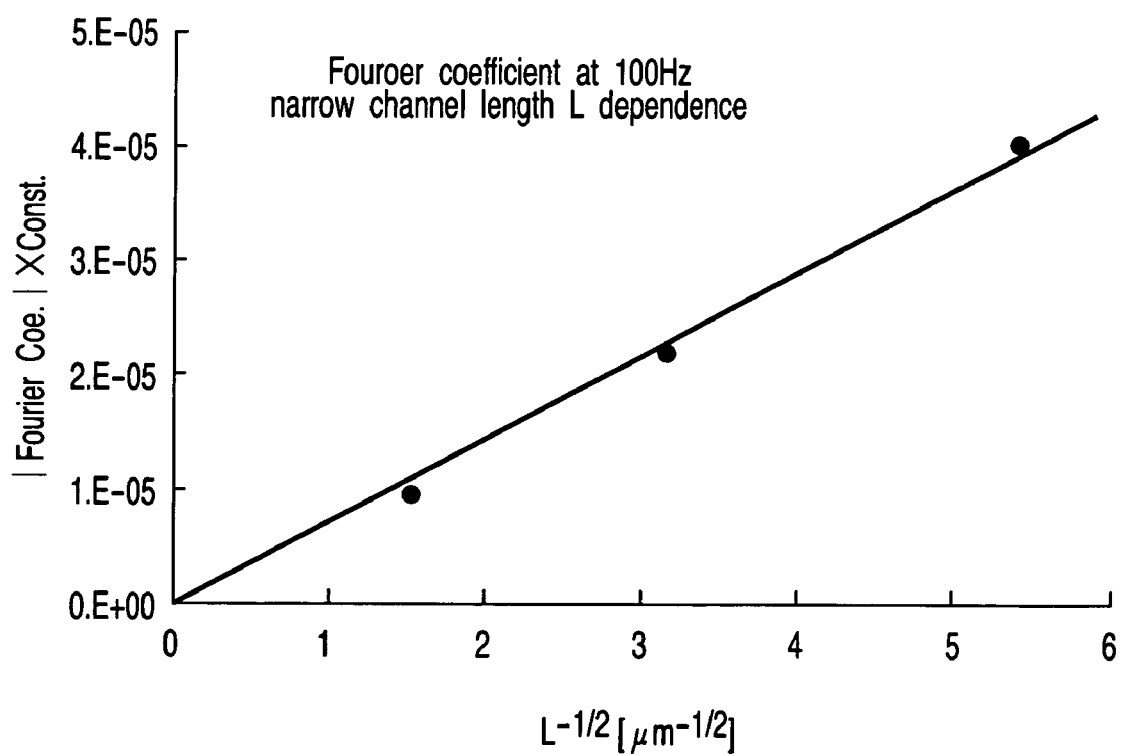
FIG. 19 is a graph illustrating the relationship between the length L of the channel thin-line portion and the Fourier coefficient, acquired from random number generating elements.

In the above-described first to seventh embodiments, the length L of the channel thin-line portion is set to 0.5 μm. A description will now be given of an embodiment where L is set shorter. FIG. 19 is a graph illustrating the relationship between the Fourier coefficient at 100 Hz and thin-line channel length L, acquired from random number generating elements. It can be understood from FIG. 19 that the Fourier characteristic is proportional to $L^{-1/2}$ provided L≦0.5 μm. It is considered that the screening effect makes the random noise Fourier characteristic greater as L is shortened. To provide the same random number generation rate, the same drain current must be set for the same drain voltage. To this end, it is necessary to increase the gate voltage as L is lengthened, in order to increase the inversion layer carrier electron density. Accordingly, as L is lengthened, the influence of supplementary electrons locally existing in fine particles is reduced by screening by a large amount of carrier electrons themselves. This being so, when viewed from the same random number generating rate, the level of random noise can be increased as L is shortened.

EIGHTH EMBODIMENT

A description will be given of a short-channel random number generating element according to an eighth embodiment in which a tunnel insulation film made of silicon oxide is formed on a bulk silicon substrate.

FIGS. 20A to 20D illustrate processes for producing the random number generating element of the eighth embodiment.

Figure 20A:
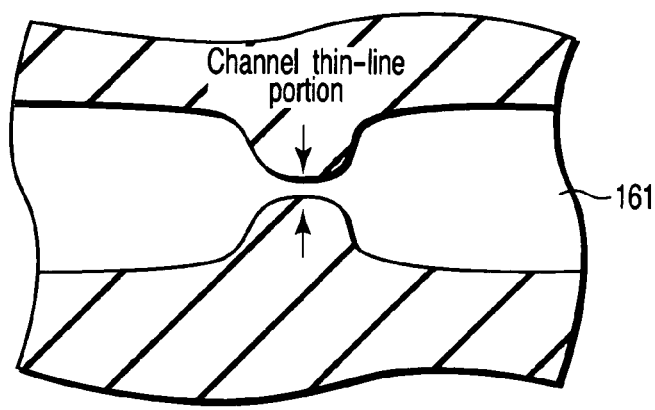
FIGS. 20A to 20D are sectional views illustrating processes for producing a random number generating element according to an eighth embodiment.

Firstly, as shown in the plan view of FIG. 20A, a channel thin-line portion pattern with a width of 0.067 μm and a length of 0.1 μm is formed in the surface of a bulk silicon substrate 91 by trench element isolation and lithography using EB or X-ray beam.

Figure 20B:
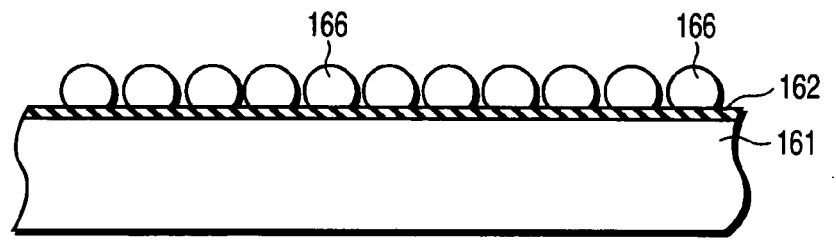

Subsequently, a silicon oxide film 162 with a thickness T of 0.8 nm is formed on the resultant structure by rapid thermal oxidation. On the silicon oxide film 162, Si fine crystal particles 166 with an average particle diameter of about 8 nm are formed, by LPCVD, with a surface density of about $5 \times 10^{11}$ cm$^{-2}$ (FIG. 20B). Also at this time, the particle diameter can be adjusted by adjusting the time of CVD, and the surface density can be adjusted by adjusting the temperature, the flow of material gas and the number of CVD applications.

Figure 20C:
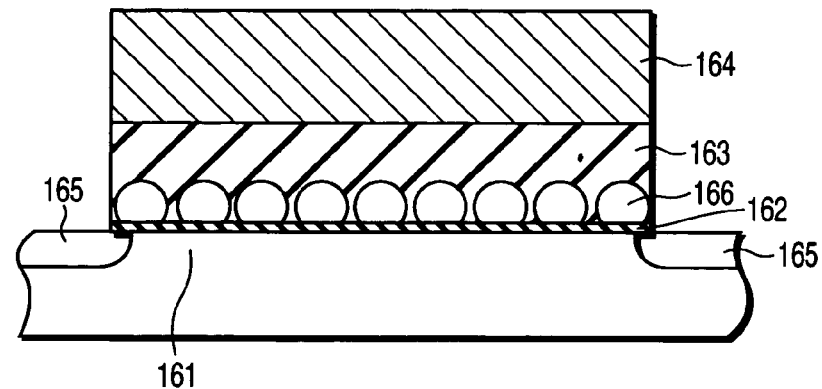
Figure 20D:
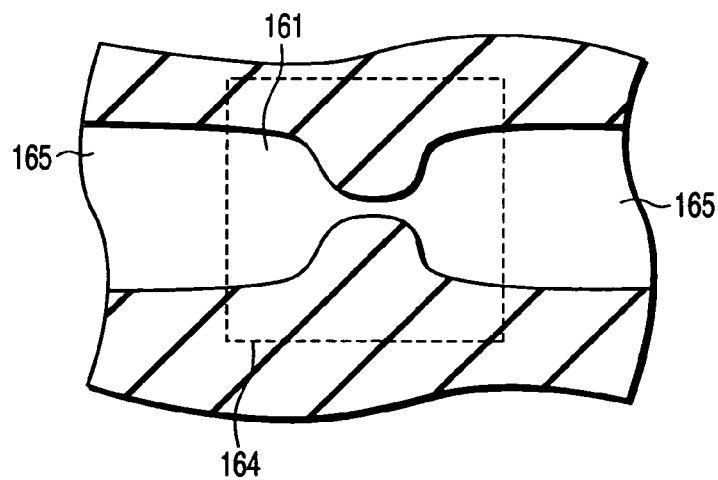

After that, as illustrated in FIGS. 20C and 20D, a control oxide film 163 with a thickness of 10 nm is formed by LPCVD. On the film 163, an n$^+$ polysilicon layer with a thickness of 200 nm is deposited by CVD. This layer is patterned using a resist pattern as a mask, thereby forming a gate electrode 164. Thereafter, phosphorus (P) is implanted in a concentration of $1 \times 10^{15}$ cm$^{-2}$ with an implantation energy of 15 KeV. The resultant structure is annealed at 1000° C. for 20 sec., thereby forming n$^+$ layers 165 serving as source/drain regions. Thus, a random number generating element is produced, which can generate random noise containing 0.1% or more of a 1-MHz oscillation component.

The reason why the random number generating element of the eighth embodiment contains 0.1% or more of a 1-MHz random oscillation component will be described.

In the fourth embodiment, W=0.03 μm and L=0.5 μm. On the other hand, in the eighth embodiment, W=0.067 μm, and therefore the random noise Fourier characteristic is reduced to 1/2.23. However, since L=0.1 μm, the Fourier characteristic is increased by 2.23 ($=(0.5/0.1)^{1/2}$) times. Accordingly, in the eighth embodiment, 0.1% or more of a 1-MHz random oscillation component is contained, as in the fourth embodiment.

NINTH EMBODIMENT

A description will be given of a short-channel random number generating element according to a ninth embodiment in which a tunnel insulation film made of silicon nitride is formed on a bulk silicon substrate.

FIGS. 21A to 21D illustrate processes for producing the random number generating element of the ninth embodiment.

Figure 21A:
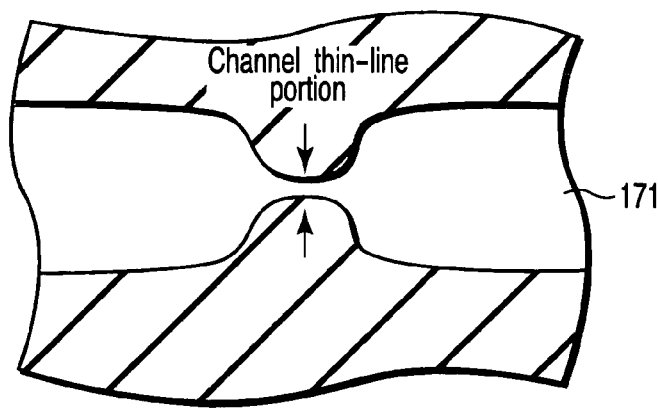
FIGS. 21A to 21D are sectional views illustrating processes for producing a random number generating element according to a ninth embodiment.
Figure 21B:
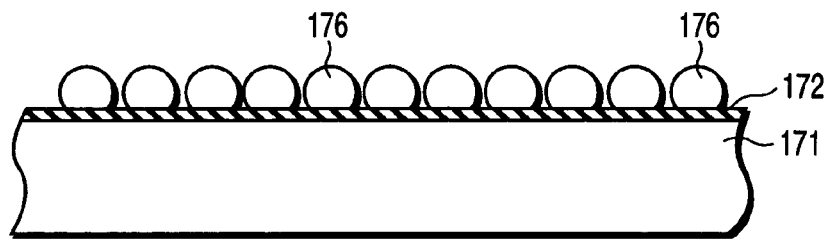

Firstly, as shown in the plan view of FIG. 21A, a channel thin-line portion pattern with a width of 0.1 μm and a length of 0.1 μm is formed in the surface of a bulk silicon substrate 171 by trench element isolation and lithography using EB or X-ray beam. Subsequently, a thermal nitride film 172 with a thickness T of 0.8 nm is formed on the resultant structure by thermal nitrization using NH$_3$. On the nitride film 172, Si fine crystal particles 176 with an average particle diameter of about 8 nm are formed, by LPCVD, with a surface density of about $1.7 \times 10^{12}$ cm$^{-2}$ (FIG. 21B). Also at this time, the particle diameter can be adjusted by adjusting the time of CVD, and the surface density can be adjusted by adjusting the temperature, the flow of material gas and the number of CVD applications.

Figure 21C:
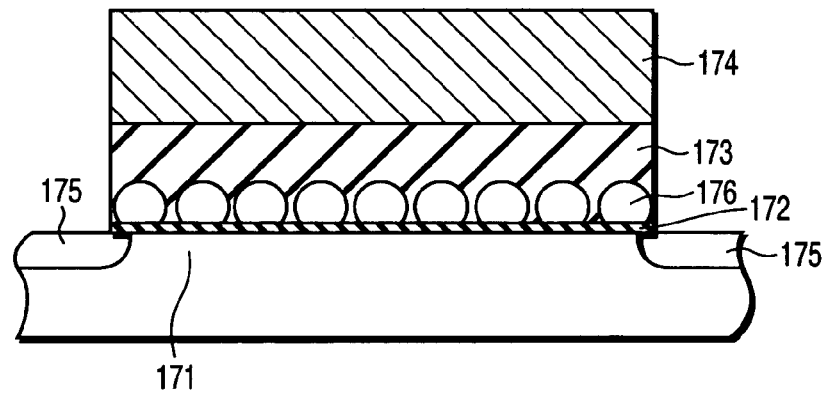
Figure 21D:
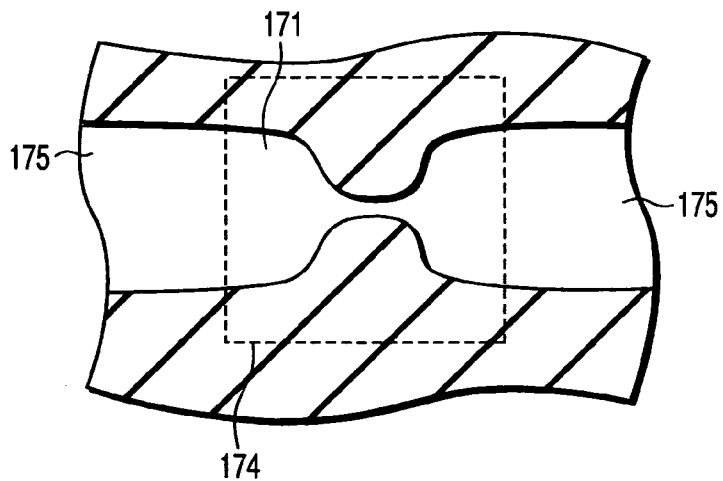

After that, as illustrated in FIGS. 21C and 21D, a control oxide film 173 with a thickness of 10 nm is formed by LPCVD. On the film 173, an n$^+$ polysilicon layer with a thickness of 200 nm is deposited by CVD. This layer is patterned using a resist pattern as a mask, thereby forming a gate electrode 174. Thereafter, phosphorus (P) is implanted in a concentration of $1 \times 10^{15}$ cm$^{-2}$ with an implantation energy of 15 KeV. The resultant structure is annealed at 1000° C. for 20 sec., thereby forming n$^+$ layers 175 serving as source/drain regions. Thus, a random number generating element is produced, which can generate random noise containing 0.1% or more of a 1-MHz oscillation component.

The reason why the random number generating element of the ninth embodiment contains 0.1% or more of a 1-MHz random oscillation component will be described.

Compared to the fifth embodiment, since the surface density is set to $7.6 \times 10^{11}$ cm$^{-2}$ in the ninth embodiment, the random noise Fourier characteristic is reduced to 1/2.23. However, since L=0.1 μm, the Fourier characteristic is increased by 2.23 ($=(0.5/0.1)^{1/2}$) times. Accordingly, in the eighth embodiment, 0.1% or more of a 1-MHz random oscillation component is contained, as in the fifth embodiment.

Since the Fourier characteristic is proportional to $L^{-1/2}$, in SOI elements, if $(D_{dot} \times d^{4/3}/W) \times \exp(-8\pi T/(2 \text{ mH})^{1/2}/3 \text{ h}) \times (0.5 \text{ μm/L})^{1/2} \geq 40(\text{μm}^{-5/3})$, 0.1% or more of 1-MHz noise is contained even if the tunnel insulation film is formed of a material and/or has a thickness other than those specified in the embodiment. For example, if a different substrate structure, such as a bulk structure, which uses a different carrier supply/absorb mechanism, is employed, the Fourier characteristic is 10 times that of the case of using an SIO substrate as shown in FIG. 12. Accordingly, if $(D_{dot} \times d^{4/3}/W) \times \exp(-8\pi T/(2 \text{ mH})^{1/2}/3 \text{ h}) \times (0.5 \text{ μm/L})^{1/2} \geq 4(\text{μm}^{-5/3})$, 0.1% or more of 1-MHz noise is contained even if the tunnel insulation film is formed of a material and/or has a thickness other than those specified in the embodiment.

In the above-described first to ninth embodiments, Si fine crystal particles are used as conductive fine particles, metal fine particles, such as Au particles, Ag particles or Al particles, may be used instead. In these cases, a method, such as sputtering, or coating of the channel surface with metal colloid particles in a solution mixed with the colloid particles, may be utilized as well as CVD employed in the first to seventh embodiments. Since metals have higher densities of states than semiconductors, the flow of electrons between the channel and fine particles is accelerated. This may well increase the level of random noise.

In the above description, the tunnel barrier height H of the tunnel insulation film is uniquely determined from the atomic structure of the material of the film. However, the barrier height H varies depending upon the state of atomic bonding, atomic density, etc. When H is deviated from the assumed value, a desired random number generation rate can be realized using a tunnel insulation film of a different thickness. This case is also included in the scope of the present embodiment, if H falls within the range specified in the embodiment for an actual tunnel resistance, because the scientific mechanism for generating random numbers is unchanged between the cases. The actual tunnel resistance acquired when H is varied can be measured by, for example, locally measuring the tunnel current using a scanning-type probe microscope.

The above description recites that the tunnel resistance of the tunnel insulation film is determined from barrier height H and thickness T. However, when the tunnel insulation film contains a large number of traps, the tunnel resistance is reduced by trap-assist-tunneling caused by relayed traps. This enables a desired random number generation rate to be acquired even by a tunnel insulation film thicker than specified. This case is also included in the scope of the present embodiment, if H falls within the range specified in the embodiment for an actual tunnel resistance, because the scientific mechanism for generating random numbers is unchanged between the cases. The tunnel resistance acquired when trap assist occurs can be measured by, for example, locally measuring the tunnel current using a scanning-type probe microscope.

If the effective tunnel resistance is not always determined from ideal barrier height H, a desired condition for random number generation can be determined from the ratio $[R_{tunnel}/R_{tunnel}(Tox=0.8\ nm)]$ of tunnel resistance $R_{tunnel}$ per unit area, which is actually obtained by measuring the tunnel current, to tunnel resistance $R_{tunnel}$ per unit area (Tox=0.8 nm) of a tunnel oxide film with a thickness of 0.8 nm.

In the case of a random number generating element formed using an SOI substrate, in which W=0.1 μm, L=0.5 μm, d=8 nm, $D_{dot}=2.5\times10^{11}$ cm$^{-2}$ and T=0.8 nm, to acquire 0.1% or more of a 1-MHz fluctuation component, it is sufficient if the Fourier characteristic of this element is multiplied by 200. From the above arguments, in the case of using, for example, an SOI substrate, 0.1% or more of a 1-MHz fluctuation component can be acquired if the following is satisfied:

$$(D_{dot}/2.5\times10^{11}\ cm^{-2})\times(d/8\ nm)^{4/3}\times(0.1\ \mu m/W)\times$$
$$[R_{tunnel}/R_{tunnel}(Tox=0.8\ nm)]^{-2/3}\times$$
$$(0.5\ \mu m/L)^{1/2}\geq 200$$

That is:

$$[D_{dot}\times d^{4/3}/(W\times L^{1/2})]\times[R_{tunnel}/R_{tunnel}(Tox=0.8\ nm)]^{-2/3}\geq 8000\times 2^{1/2}(\mu m^{-13/6})$$

In the case of using, for example, a bulk substrate, since the Fourier characteristic is increased by 10 times the above case using an SOI substrate, 0.1% or more of a 1-MHz fluctuation component can be acquired if the following is satisfied:

$$(D_{dot}/2.5\times10^{11}\ cm^{-2})\times(d/8\ nm)^{4/3}\times(0.1\ \mu m/W)\times$$
$$[R_{tunnel}/R_{tunnel}(Tox=0.8\ nm)]^{-2/3}\times$$
$$(0.5\ \mu m/L)^{1/2}\geq 20$$

That is:

$$[D_{dot}\times d^{4/3}/(W\times L^{1/2})]\times[R_{tunnel}/R_{tunnel}(Tox=0.8\ nm)]^{-2/3}\geq 800\times 2^{1/2}(\mu m^{-13/6})$$

As described above, there is a case where the effective tunnel resistance is not always determined from ideal barrier height H. The following two conditions include barrier height H that is one of the above-mentioned desirable ranges for the parameters:

$$LWD_{dot}\geq \exp(0.3\ nm\times(4\pi(2mH)^{1/2}/h)),$$

$$\exp(-4\pi T(2\ mH)^{1/2}/h)\geq 1/12560$$

where T represents the actual thickness of the tunnel insulation film, and m represents an effective mass assumed when the very thin tunnel film is directly tunneled, the effective mass being about 0.3 times the electron rest mass.

If effective barrier height H* is defined, provided $R_{tunnel}\propto\exp(4\pi T(2mH)^{1/2}/h)$, desirable ranges for the parameters can be expressed.

From the above, the following inequalities that express desirable ranges for the parameters are extracted:

$$LWD_{dot}\geq[R_{tunnel}/R_{tunnel}(Tox=0.8\ nm)]^{0.3\ nm/T}\times$$
$$\exp[0.3\ nm\times(0.8\ nm/T)\times 4\pi(2m\times 3.1\ eV)^{1/2}/h)],$$

$$[R_{tunnel}/R_{tunnel}(Tox=0.8\ nm)]^{-1}\times\exp(-0.8\ nm\times$$
$$(4\pi(2m\times 3.1\ eV)^{1/2}/h))\geq 1/12560$$

In the above inequalities, the barrier height of an oxide film, i.e., 3.1 eV, is used.

It is a matter of course that even if the tunnel resistance is not determined from those ideal barrier heights H, it can be determined therefrom, if $R_{tunnel}\propto\exp(4\pi T(2\ mH)^{1/2}/h)$ is utilized, as is described above.

The present embodiment is not limited to the above-described random number generating elements, but may be modified in various ways without departing from the scope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A random number generating element comprising:
   a source region;
   a drain region;
   a semiconductor channel provided between the source region and the drain region and having a thin-line portion of a width W and a length L, the width W and the length L satisfying $W\leq(\pi/10(\mu m^2))/L$;
   a tunnel insulation film provided on the semiconductor channel; and
   a conductive fine particle group containing a plurality of conductive fine particles provided on the tunnel insulation film with a surface density not less than $2.5\times10^{11}$ cm$^{-2}$, the conductive fine particles being charge and discharge by electrons tunneling through the tunnel insulation film, the conductive fine particle group being formed over the semiconductor channel; and
   a gate region provided over the conductive fine particle group,
   wherein the following inequalities are satisfied:

$$LWD_{dot}\geq[R_{Tunnel}/R_{Tunnel}(Tox=0.8\ nm)]^{0.3\ nm/T}\times$$
$$\exp[0.3\ nm\times(0.8\ nm/T)\times(4\pi(2m\times 3.1\ eV)^{1/2}/h)],$$

$$(q/4\pi\in T)\geq 26\ mV,$$

$$[D_{dot}\times d^{4/3}/(W\times L^{1/2})]\times[R_{Tunnel}/R_{Tunnel}(Tox=0.8\ nm)]^{-2/3}\geq 8000\times 2^{1/2}(\mu m^{-13/6})$$

where $D_{dot}$ represents the surface density of the conductive fine particles, d an average diameter of the conductive fine particles, T a thickness of the tunnel insulation film, $R_{tunnel}$ a tunnel resistance of the tunnel insulation film per unit area, $R_{tunnel}$ (Tox=0.8 nm) a tunnel resistance, per unit area, of a tunnel oxide film with a thickness of 0.8 nm, h Plank's constant, q elemental charge, m an effective mass of a tunnel via the tunnel insulation film, and $\in$ a dielectric constant of the tunnel insulation film.

2. The element according to claim 1, wherein the following inequality is satisfied:

$$[R_{Tunnel}/R_{Tunnel}(Tox=0.8\ nm)]^{-1}\times\exp(-0.8\ nm\times$$
$$(4\pi(2m\times 3.1\ eV)^{1/2}/h))\geq 1/12560.$$

3. A random number generating element comprising:
a source region;
a drain region;
a semiconductor channel provided between the source region and the drain region and having a thin-line portion of a width W and a length L, the width W and the length L satisfying $W \leq (\pi/10(\mu m^2))/L$;
a tunnel insulation film provided on the semiconductor channel; and
a conductive fine particle group containing a plurality of conductive fine particles provided on the tunnel insulation film with a surface density not less than $2.5 \times 10^{11}$ cm$^{-2}$, the conductive fine particles being charged and discharged by electrons tunneling through the tunnel insulation film, the conductive fine particle group being formed over the semiconductor channel; and
a gate region provided over the conductive fine particles group,
wherein the following inequalities are satisfied:

$$LWD_{dot} \geq \exp(0.3 \text{ nm} \times 4\pi(2mH)^{1/2}/h),$$

$$(q/4\pi \in T) \geq 26 \text{ mV},$$

$$(D_{dot} \times d^{4/3}/W) \times \exp(-8\pi T(2mH)^{1/2}/3h) \times (0.5 \text{ }\mu m/L)^{1/2} \geq 40(\mu m^{-5/3})$$

where $D_{dot}$ represents the surface density of the conductive fine particles, d an average diameter of the conductive fine particles, T a thickness of the tunnel insulation film, H an energy barrier height of the tunnel insulation film, h Plank's constant, q elemental charge, m an effective mass of a tunnel via the tunnel insulation film, and $\in$ a dielectric constant of the tunnel insulation film.

4. The element according to claim 3, wherein the following inequality is satisfied:

$$\exp(-4\pi T(2mH)^{1/2}/h) \geq 1/12560.$$

5. The element according to claim 3, wherein:
the tunnel insulation film includes a silicon oxide film;
at least 20 conductive fine particles are contained in the conductive fine particle group; and
the following relation satisfies:

$$(D_{dot} \times d^{4/3} \exp(-T/0.152 \text{ nm})/W) \times (0.5 \text{ }\mu m/L)^{1/2} \geq 40(\mu m^{-5/3}).$$

6. The element according to claim 5, wherein the thickness T of the silicon oxide film is not more than 0.92 nm.

7. The element according to claim 3, wherein:
the tunnel insulation film includes a silicon nitride film;
at least 11 conductive fine particles are contained in the conductive fine particle group; and
the following relation is satisfied:

$$(D_{dot} \times d^{4/3} \exp(-T/0.189 \text{ nm})/W) \times (0.5 \text{ }\mu m/L)^{1/2} \geq 40(\mu m^{-5/3}).$$

8. The element according to claim 7, wherein the thickness T of the silicon nitride film is not more than 1.2 nm.

9. The element according to claim 3, wherein:
the tunnel insulation film includes a hafnium oxide film;
at least 7 conductive fine particles are contained in the conductive fine particle group; and
the following relation satisfies:

$$(D_{dot} \times d^{4/3} \exp(-T/0.218 \text{ nm})/W) \times (0.5 \text{ }\mu m/L)^{1/2} \geq 40(\mu m^{-5/3}).$$

10. The element according to claim 9, wherein the thickness T of the hafnium oxide film is not more than 1.35 nm.

11. The element according to claim 3, wherein:
the tunnel insulation film includes a cerium oxide film with a thickness of not more than 2 nm;
the conductive fine particle group is provided on the thin-line portion with a surface density not less than $2.5 \times 10^{11}$ cm$^{-2}$, via the cerium oxide film, the conductive fine particle groups containing at least 2 conductive fine particles, the conductive fine particles being charge and discharge by electrons tunneling through the cerium oxide film; and
the following relation is satisfied:

$$(D_{dot} \times d^{4/3} \exp(-T/0.845 \text{ nm})/W) \times (0.5 \text{ }\mu m/L)^{1/2} \geq 40(\mu m^{-5/3}).$$

12. The element according to claim 3, wherein the conductive fine particle group has an average particle diameter of 5 nm to 20 nm.

13. The element according to claim 3, wherein the conductive fine particles are formed of Si fine crystals.

14. The element according to claim 3, wherein the conductive fine particles include metal fine particles.

15. The element according to claim 3, wherein the conductive fine particle group forms a polycrystalline film.

16. A random number generating element comprising:
a source region;
a drain region;
a semiconductor channel provided between the source region and the drain region and having a thin-line portion of a width W and a length L, the width W and the length L satisfying $W \leq (\pi/10(m^2))/L$;
a tunnel insulation film provided on the semiconductor channel; and
a conductive fine particle group containing a plurality of conductive fine particles provided on the tunnel insulation film with a surface density not less than $2.5 \times 10^{11}$ cm$^{-2}$, the conductive fine particles being charged and discharged by electrons tunneling through the tunnel insulation film, the conductive fine particles group being formed over the semiconductor channel; and
a gate region provided over the conductive fine particle group,
wherein the following inequalities are satisfied:

$$LWD_{dot} \geq [R_{Tunnel}/R_{Tunnel}(\text{Tox}=0.8 \text{ nm})]^{0.3 \text{ nm}/T} \times \exp[0.3 \text{ nm} \times (0.8 \text{ nm}/T) \times (4\pi(2m \times 3.1 \text{ eV})^{1/2}/h)],$$

$$(q/4\pi \in T) \geq 26 \text{ mV},$$

$$[D_{dot} \times d^{4/3}/(W \times L^{1/2})] \times [R_{Tunnel}/R_{Tunnel}(\text{Tox}=0.8 \text{ nm})]^{-2/3} \geq 800 \times 2^{1/2}(\mu m^{-13/6})$$

where $D_{dot}$ represents the surface density of the conductive fine particles, d an average diameter of the conductive fine particles, T a thickness of the tunnel insulation film, $R_{tunnel}$ a tunnel resistance of the tunnel insulation film per unit area, $R_{tunnel}(\text{Tox}=0.8 \text{ nm})$ a tunnel resistance, per unit area, of a tunnel oxide film with a thickness of 0.8 nm, h Plank's constant, q elemental charge, m an effective mass of a tunnel via the tunnel insulation film, and $\in$ a dielectric constant of the tunnel insulation film.

17. The element according to claim 16, wherein the following inequality is satisfied:

$$[R_{Tunnel}/R_{Tunnel}(\text{Tox}=0.8 \text{ nm})]^{-1} \times \exp(-0.8 \text{ nm} \times (4\pi(2m \times 3.1 \text{ eV})^{1/2}/h)) \geq 1/12560.$$

18. A random number generating element comprising:
a source region;
a drain region;
a semiconductor channel provided between the source region and the drain region and having a thin-line portion of a width W and a length L, the width W and the length L satisfying $W \leq (\pi/10(\mu m^2))/L$;
a tunnel insulation film provided on the semiconductor channel; and
a conductive fine particle group containing a plurality of conductive fine particles provided on the tunnel insulation film with a surface density not less than $2.5 \times 10^{11}$ cm$^{-2}$, the conductive fine particles being charged and discharged by electrons tunneling through the tunnel insulation film, the conductive fine particle group being formed over the semiconductor channel; and
a gate region provided over the conductive fine particle group,
wherein the following inequalities are satisfied:

$$LWD_{dot} \geq \exp(0.3 \text{ nm} \times 4\pi(2mH)^{1/2}/h),$$

$$(q/4\pi \in T) \geq 26 \text{ mV},$$

$$(D_{dot} \times d^{4/3}/W) \times \exp(-8\pi T(2mH)^{1/2}/3h) \times (0.5 \text{ }\mu m/L)^{1/2} \geq 4(\mu m^{-5/3})$$

where $D_{dot}$ represents the surface density of the conductive fine particles, d an average diameter of the conductive fine particles, T a thickness of the tunnel insulation film, H an energy barrier height of the tunnel insulation film, h Plank's constant, q elemental charge, m an effective mass of a tunnel via the tunnel insulation film, and $\in$ a dielectric constant of the tunnel insulation film.

19. The element according to claim 18, wherein the following inequality is satisfied:

$$\exp(-4\pi T(2mH)^{1/2}/h) \geq 1/12560.$$

20. The element according to claim 18, wherein:
the tunnel insulation film includes a silicon oxide film;
the conductive fine particle group is provided on the thin-line portion with a surface density not less than $2.5 \times 10^{11}$ cm$^{-2}$, via the silicon oxide film, the conductive fine particle groups containing at least 20 conductive fine particles, the silcon oxide film; and
the following relation is satisfied:

$$(D_{dot} \times d^{4/3} \times \exp(-T/0.152 \text{ nm})/W) \times (0.5 \text{ }\mu m/L)^{1/2} \geq 40(\mu m^{-5/3}).$$

21. The element according to claim 20, wherein the thickness T of the silicon oxide film is not more than 0.92 nm.

22. The element according to claim 18, wherein:
the tunnel insulation film includes a silicon nitride film;
the conductive fine particle group is provided on the thin-line portion with a surface density not less than $2.5 \times 10^{11}$ cm$^{-2}$, via the silicon nitride film, the conductive fine particle groups containing at least 11 conductive fine particles, the silicon nitride film; and
the following relation satisfies:

$$(D_{dot} \times d^{4/3} \times \exp(-T/0.189 \text{ nm})/W) \times (0.5 \text{ }\mu m/L)^{1/2} \geq 40(\mu m^{-5/3}).$$

23. The element according to claim 22, wherein the thickness T of the silicon nitride film is not more than 1.2 nm.

24. The element according to claim 18, wherein:
the tunnel insulation film includes a hafnium oxide film;
the conductive fine particle group is provided on the thin-line portion with a surface density not less than $2.5 \times 10^{11}$ cm$^{-2}$, via the hafnium oxide film, the conductive fine particle groups containing at least 7 conductive fine particles, the conductive fine particles being charged and discharged by electrons tunneling through the hafnium oxide film; and
the following relation satisfies:

$$(D_{dot} \times d^{4/3} \times \exp(-T/0.218 \text{ nm})/W) \times (0.5 \text{ }\mu m/L)^{1/2} \geq 40(\mu m^{-5/3}).$$

25. The element according to claim 24, wherein the thickness T of the hafnium oxide film is not more than 1.35 nm.

26. The element according to claim 18, wherein:
the tunnel insulation film includes a cerium oxide film with a thickness of not more than 2 nm;
the conductive fine particle group is provided on the thin-line portion with a surface density not less than $2.5 \times 10^{11}$ cm$^{-2}$, via the cerium oxide film, the conductive fine particle groups containing at least 2 conductive fine particles, the conductive fine particles being charged and discharged by electrons tunneling through the cerium oxide film; and
the following relation satisfies:

$$(D_{dot} \times d^{4/3} \times \exp(-T/0.845 \text{ nm})/W) \times (0.5 \text{ }\mu m/L)^{1/2} \geq 40(\mu m^{-5/3}).$$

27. The element according to claim 18, wherein, the conductive fine particle group has an average particle diameter of 5 nm to 20 nm.

28. The element according to claim 18, wherein the conductive fine particles are formed of Si fine crystals.

29. The element according to claim 18, wherein the conductive fine particles include metal fine particles.

30. The element according to claim 18, wherein the conductive fine particle group forms a polycrystalline film.

* * * * *